United States Patent [19]

Fuchs et al.

[11] Patent Number: 4,785,098
[45] Date of Patent: Nov. 15, 1988

[54] WATER-SOLUBLE TRIPHENDIOXAZINE COMPOUNDS

[75] Inventors: Hermann Fuchs; Hartmut Springer, both of Königstein; Günther Schwaiger, Frankfurt am Main, all of Fed. Rep. of Germany

[73] Assignee: Hoechst Aktiengesellschaft, Frankfurt am Main, Fed. Rep. of Germany

[21] Appl. No.: 756,770

[22] Filed: Jul. 18, 1985

[30] Foreign Application Priority Data

Jul. 20, 1984 [DE] Fed. Rep. of Germany ....... 3426727

[51] Int. Cl.$^4$ ............................................. C09B 19/00
[52] U.S. Cl. ......................................... 544/76; 544/77
[58] Field of Search .................................... 544/76, 77

[56] References Cited

U.S. PATENT DOCUMENTS

| 3,996,221 | 12/1976 | Leng et al. | 544/75 X |
| 4,092,478 | 5/1978 | Plant et al. | 544/76 |
| 4,336,377 | 6/1982 | Adam et al. | 544/74 |
| 4,400,504 | 8/1983 | Harms et al. | 544/76 |
| 4,472,575 | 9/1984 | Renfrew | 544/76 |
| 4,512,773 | 4/1985 | Anderton et al. | 544/74 |
| 4,577,015 | 3/1956 | Jäger et al. | 544/76 |
| 4,621,138 | 11/1986 | Jäger et al. | 544/76 |
| 4,629,788 | 12/1986 | Jäger | 544/76 |

FOREIGN PATENT DOCUMENTS

| 101665 | 2/1984 | European Pat. Off. . |
| 141996 | 5/1985 | European Pat. Off. . |
| 2360643 | 3/1978 | France . |
| 2397443 | 2/1979 | France . |
| 2059985 | 4/1981 | United Kingdom . |

Primary Examiner—Richard L. Raymond

[57] ABSTRACT

Triphendioxazine compounds, which are suitable as fiber-reactive dyestuffs, of the general formula (1)

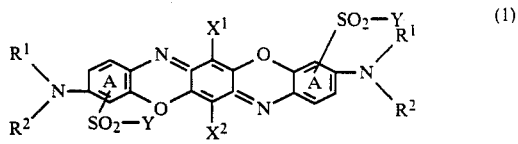

in which $R^1$ and $R^2$ are each a hydrogen atom, an optionally substituted alkyl group with 1 to 8 carbon atoms, the substituents being, for example, sulfo, sulfato, carboxy and optionally substituted alkylamino and dialkylamino groups, or a cycloalkyl group which can optionally be substituted by methyl and/or amino, alkanoylamino or benzoylamino, or an optionally substituted phenyl radical, the substituents of which are, for example, sulfo, carboxy, halogen, alkyl with 1 to 4 carbon atoms, alkoxy with 1 to 4 carbon atoms, nitro and β-sulfatoethylsulfonyl, or a naphthyl radical which can be substituted by 1, 2 or 3 sulfo groups and/or a fiber-reactive group of the vinylsulfone series, or in which $R^1$ and $R^2$, together with the nitrogen atom, can form a heterocyclic radical, and in which the benzene nuclei A can be substituted by 1 or 2 substituents from the group comprising alkyl with 1 to 6 carbon atoms, alkoxy with 1 to 5 carbon atoms, halogen, carboxyl and sulfo, the two radicals $X^1$ and $X^2$ are identical to one another or different from one another and are a hydrogen atom, a halogen atom, a cycloalkyl group, an aralkoxy group, an alkoxy group, an aryloxy group, an alkyl group, an aryl group, an aralkyl group or a cyano, carboxy, carbalkoxy, mono- or di-alkylcarbamoyl, arylarylcarbamoyl, alkanoylamino or aroylamino group, and Y represents the vinyl group or ethyl group which contains, in the β-position, a substituent which can be eliminated by an alkali, or is the β-hydroxyethyl group, and M represents a hydrogen atom or an alkali metal or the equivalent of an alkaline earth metal, and the compound (1) contains at least one sulfo or sulfato group.

The compounds (1) are used for dyeing material containing hydroxy and/or carboxamide groups, in particular fiber material, such as cellulose fiber material and wool, on which they give deep blue dyeings.

20 Claims, No Drawings

WATER-SOLUBLE TRIPHENDIOXAZINE COMPOUNDS

The present invention relates to the field of fiber-reactive dyestuffs.

Triphendioxazine compounds corresponding to the general formula (1)

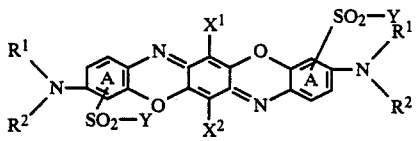

which have useful fiber-reactive dyestuff properties have been found.

In this formula (1):

$R^1$ is a hydrogen atom or an alkyl group which has 1 to 8 carbon atoms, preferably 1 to 6 carbon atoms and in particular 1 to 4 carbon atoms and which can be substituted, or is a cycloalkyl group which has 5 to 8 carbon atoms, such as the cyclopentyl or cyclohexyl group, and with optionally 1 to 3 methyl groups and/or one amino group, alkanoylamino group with 2 to 5 carbon atoms or benzoylamino group as substituents, or is the phenyl radical which can be substituted by 1, 2 or 3, preferably 1 or 2, substituents from the group comprising sulfo (which is a group of the general formula —$SO_3M$, where M has the meaning given below), carboxy (which is a group of the general formula —COOM, where M has the meaning given below), halogen, such as bromine and in particular chlorine, alkyl with 1 to 4 carbon atoms, such as methyl and ethyl, alkoxy with 1 to 4 carbon atoms, such as methoxy and ethoxy, nitro, a group of the formula —$SO_2$—Y' where Y' has the meaning given below, alkylamino with an alkyl radical with 1 to 4 carbon atoms dialkylamino with alkyl radicals with in each case 1 to 4 carbon atoms, alkanoylamino with 2 to 5 carbon atoms, such as acetylamino, and benzoylamino, or is a naphthyl radical which can be substituted by 1, 2 or 3 sulfo groups and/or a group of the formula —$SO_2$—Y', $R^2$ has one of the meanings given for $R^1$, $R^2$ being identical to $R^1$ or different from $R^1$, or $R^1$ and $R^2$, together with the nitrogen atom and 1, 2 or 3 alkylene radicals with 1 to 5 carbon atoms and/or one or two further heteroatoms, such as nitrogen, oxygen or sulfur atoms, form a 5-membered to 8-membered heterocylic radical, such as, for example, the piperidino, piperazino or morpholino radical, it being possible for the two —$NR^1R^2$ groups to have the same meanings as one another or different meanings to one another;

the two benzene nuclei A can be substituted by 1 or 2 substituents, preferably 1 substituent, from the group comprising alkyl with 1 to 6 carbon atoms, preferably 1 to 4 carbon atoms, such as, in particular, methyl and ethyl from these, alkoxy with 1 to 5 carbon atoms, preferably 1 to 4 carbon atoms, such as, in particular, methoxy and ethoxy from these, halogen, such as fluorine and bromine and in particular chlorine, carboxy and sulfo, it being possible for the substitutions in the two benzene nuclei A to be identical to one another or different from one another, the substitution preferably being identical;

$X^1$ is a hydrogen atom or a halogen atom, such as, in particular, a chlorine or bromine atom, a cycloalkyl group, an aralkyloxy group, an alkoxy group with 1 to 4 carbon atoms, such as the methoxy group, an aryloxy group, an alkyl group with 1 to 4 carbon atoms, such as the methyl group, an aryl group, an aralkyl group, a cyano group, a carboxy group, a carbalkoxy group with 2 to 5 carbon atoms, such as the carbomethoxy or carbethoxy group, an N-alkyl-carbamoyl group or N,N-dialkyl-carbamoyl group with alkyl radicals with in each case 1 to 4 carbon atoms, an N-arylcarbamoyl group, an alkanoylamino group with 2 to 5 carbon atoms, such as the acetylamino group, or an aroylamino group, such as the benzoylamino group, the aryl radicals in these substituents preferably being phenyl radicals which can be further substituted by 1 or 2 substituents of the group comprising halogen, such as chlorine, nitro, alkyl with 1 to 4 carbon atoms, alkoxy with 1 to 4 carbon atoms, carboxy and sulfo, and $X^1$ preferably being a hydrogen atom, an alkanoylamino group with 2 to 5 carbon atoms, a phenoxy group which can be substituted by chlorine, an alkoxy group with 1 to 4 carbon atoms, an alkyl group with 1 to 4 carbon atoms or, particularly preferably, a chlorine or bromine atom;

$X^2$ is identical to $X^1$ or different from $X^1$ and has one of the meanings given for $X^1$;

the group —$SO_2$—Y is preferably bonded in the orthoposition relative to the amino group —$NR^1R^2$, and both can have meanings which are different from one another or, preferably, identical to one another, Y is the vinyl group, or an ethyl group which contains in the β-position a substituent which can be eliminated by an alkali, or is the β-hydroxyethyl group, at least one of the two radicals Y, preferably both, necessarily representing the vinyl group or the β-substituted ethyl group mentioned, in particular a β-sulfatoethyl group, if one or both of $R^1$ and/or $R^2$ together do not contain any or contain only one β-sulfatoethylsulfonyl or vinylsulfonyl group as substituents;

Y' is the vinyl group, the β-hydroxyethyl group or an ethyl group which is substituted in the β-position by a substituent which can be eliminated by an alkali;

M is a hydrogen atom or an alkali metal atom, such as sodium, potassium or lithium, or the equivalent of an alkaline earth metal, such as, for example, of calcium; and of the sulfo and sulfato groups which the molecule (1) can contain, the molecule (1) necessarily contains at least one, and preferably at least two.

Substituents which, according to the formula member Y or Y', are in the β-position of the ethyl group and can be eliminated by an alkali to form the vinyl group are, for example, alkanoyloxy groups with 2 to 5 carbon atoms, such as the acetoxy group, aroyloxy groups, such as the benzoyloxy, sulfobenzoyloxy or carboxybenzoyloxy group, dialkylamino groups with alkyl radicals of 1 to 4 carbon atoms, such as, in particular, the dimethylamino or diethylamino group, the chlorine atom, the bromine atom, alkylsulfonyloxy groups with alkyl radicals with 1 to 4 carbon atoms, a phosphato group (which is a group of the general formula —O-$PO_3M_2$, where M has the abovementioned meaning), a thiosulfato group (which is a group of the general formula —S—$SO_3M$, where M has the abovementioned meaning) or a sulfato group (which is a group of the general formula —$OSO_3M$, where M has the abovementioned meaning). Preferred groups corresponding to the formula member Y are the β-chloroethyl, β-phosphatoethyl and β-thiosulfatoethyl groups, and in particular the vinyl group, and especially preferably the β-sulfatoethyl group.

The formula member Y' is preferably the β-hydroxyethyl, β-phosphatoethyl, vinyl or β-sulfatoethyl group. The radicals Y and Y' can have identical meanings to one another or different meanings to one another.

The alkyl groups $R^1$ and $R^2$ can be substituted, such as, for example, by one or two substituents from the group of substituents comprising hydroxy, halogen, such as bromine and in particular chlorine, sulfato, phosphato, sulfo, carboxy, carbalkoxy with 2 to 5 carbon atoms, such as carbomethoxy and carbethoxy, alkanoylamino with 2 to 5 carbon atoms, such as acetylamino, alkylamino with 1 to 4 carbon atoms in the carboxy group or a sulfato group, or are substituted by a monosulfophenyl or disulfophenyl group, are particularly preferred. $R^2$ is particularly preferably a β-(monosulfophenyl- or -disulfophenyl)-ethyl or -methyl group or a β-sulfatopropyl group or a γ-sulfato-propyl, a β-sulfatoethyl, a β,γ-disulfatopropyl, a β-sulfato-isopropyl, an γ-sulfatomethyl-propyl, a β-(β'-sulfatoethoxy)-ethyl or a β-sulfo-ethyl group. The β-sulfatoethyl group is preferred. Compounds of the formula (1) in which each $R^1$ is a hydrogen atom are also preferred.

Triphendioxazine compounds according to the invention which are to be particularly singled out are those which correspond to the general formula (2a)

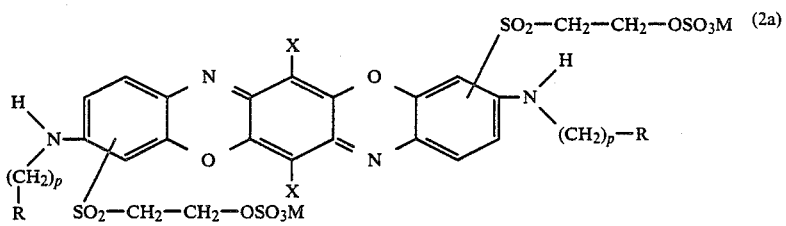

alkyl radical, such as methylamino and ethylamino, dialkylamino with 1 to 4 carbon atoms in the alkyl radicals, such as dimethylamino and diethylamino, an alkylamino or dialkylamino which has in each case 1 to 4 carbon atoms in the alkyl radicals of the mono- or dialkylamine and is substituted in the alkyl radicals by a hydroxy, sulfo, carboxy, sulfato or phosphato group or by an alkoxy group with 1 to 4 carbon atoms or by a β-sulfatoethoxy or β-sulfato-di-, -tri- or -tetra-glycol ether group, a group of the formula —SO₂—Y' where Y' has the above-mentioned meaning, phenyl and phenyl which is substituted by substituents from the group comprising alkyl with 1 to 4 carbon atoms, alkoxy with 1 to 4 carbon atoms, halogen, such as bromine and in particular chlorine, nitro, sulfo, carboxy, a group of the formula —SO₂—Y' where Y' has the abovementioned meaning, amino, alkylamino with an alkyl radical of 1 to 4 carbon atoms, alkanoylamino with 2 to 5 carbon atoms, such as acetylamino, benzoyolamino, sulfobenzoylamino, and/or carbalkoxy of 2 to 5 C-atoms. Phenyl-substituted alkyl groups are preferably benzyl and the phenethyl group.

The two formula radicals —NR¹R² preferably have the same meaning; likewise, X¹ and X² preferably have the same meaning.

If the benzene nuclei A are substituted by a substituent from the abovementioned group, this is bonded in the ortho-position, preferably in the meta- or para-position relative to the group —SO₂—Y. Preferably, however, the benzene nuclei A are not substituted by one or two further substituents.

Of the radicals R¹ and R², those which represent a hydrogen atom or an alkyl group with 1 to 4 carbon atoms which can be substituted by a sulfo group, a in which X represents a bromine or, preferably a chlorine atom, M is a hydrogen atom or, preferably, an alkali metal atom, such as, in particular, sodium, p represents the number 1, 2, 3 or 4, preferably 1, 2 or 3, and R is a sulfo, sulfato or β-(β'-sulfatoethoxy)-ethyl group or a monosulfophenyl or disulfophenyl group. Groups which are preferred for the radical —(CH₂)ₚ—R are the β-sulfatoethyl, the α-sulfatoethyl, the β-sulfato-β-methyl-ethyl, the β-sulfato-α-ethyl-ethyl, the β-sulfato-α-ethyl, the β-sulfatoethyl, the β-γ-disulfato-propyl, the p-sulfophenethyl, and the β-(2,4-disulfo-phenyl)-ethyl group, a sulfobenzyl group, such as, in particular, the p-sulfobenzyl group, a disulfobenzyl group and the β-(β'-sulfatoethoxy)-ethyl group.

Triphendioxazine compounds according to the invention which are especially to be singled out are those which correspond to the general formula (2b)

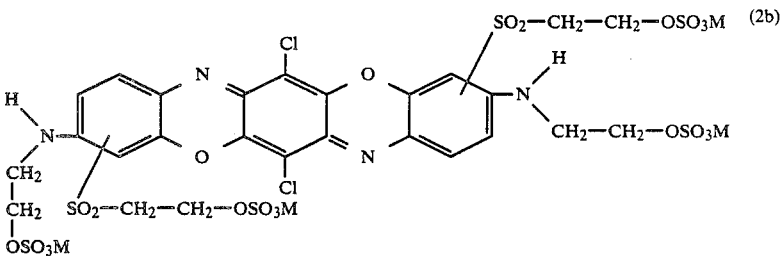

in which M represents a hydrogen atom or, preferably, an alkali metal atom, such as, in particular, sodium, and the β-sulfatoethylsulfonyl groups bonded in the aromatic nucleus are in the ortho-position relative to the particular N-(β-sulfatoethyl)-amino group.

The novel dioxazine compounds can be either in acid form or in the form of their salts. They are preferably in the form of salts, in particular the alkali metal and alkaline earth metal salts, and are also preferably used in the form of these salts for dyeing (understood here and below in the general sense and including printing) materials containing hydroxy and/or carboxamide groups, in particular fiber materials.

The present invention furthermore relates to processes for the preparation of the abovementioned defined compounds of the general formula (1). These comprise first reacting an amino compound of the general formula (3)

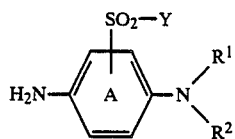
(3)

in which Y has the abovementioned meaning and is preferably the β-hydroxyethyl group and A, R¹ and R² have the abovementioned meanings, but the benzene nucleus A necessarily cannot be substituted in one of the ortho-positions relative to the primary amino group given, in twice the molar amount, by known procedures which are customary per se for the synthesis of triphendioxazine compounds, with a 1,4-benzoquinone compound of the general formula (4)

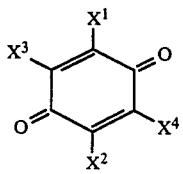
(4)

in which $X^1$ and $X^2$ have the abovementioned meanings and $X^3$ and $X^4$ are identical to one another or different from one another and each represents a hydrogen atom, an alkoxy group with 1 to 4 carbon atoms, such as, in particular, the methoxy group, or a phenoxy group, or is preferably a halogen atom, such as bromine atom or, in particular, a chlorine atom, it being possible for $X^3$ and $X^4$ also to have a meaning identical to $X^1$ and $X^2$, to form an intermediate of the assumed general formula (5)

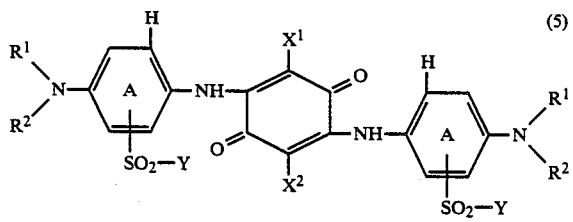
(5)

in which A, R¹, R², X¹, X² and Y have the above-mentioned meanings, and, if appropriate after intermediate isolation, cyclizing this intermediate, preferably in the presence of an oxidizing agent, to give the triphendioxazine, any hydroxyalkyl groups which may be present, such as, for example, the β-hydroxyethyl groups of the formula radical Y, being converted, if appropriate, into the corresponding β-sulfatoalkyl or β-phosphatoalkyl groups by means of a sulfating or phosphating agent, such as 96–100% strength sulfuric acid, sulfuric acid containing sulfur trioxide or polyphosphoric acid, before or at the same time as the cyclization or only after the cyclization reaction. Compounds of the formula (1) where Y or Y' is a β-sulfatoethylsulfonyl group can then be converted, by known procedures, into other compounds of the formula (1) according to the invention in which Y and/or Y' represent the vinyl group or an ethyl group with a different substituent in the β-position which can be eliminated with an alkali. 2,3,5,6-Tetrachloro-1,4-benzoquinone (chloranil) is preferably employed as the compound of formula 4), also 2,3,5,6-tetrabromo-1,4-benzoquinone.

The reaction according to the invention of a compound of the general formula (3) or two different amino compounds of the general formula (3), in each case together in twice the equivalent amount, with one equivalent of a compound of the general formula (4) to give the anil corresponding to the general formula (5) can be carried out in an aqueous medium or in an aqueous-organic medium or in a purely organic medium, the organic solvents being polar aprotic and protic solvents, such as, for example, lower alkanols, such as methanol and ethanol, and halogenated benzenes, such as o-dichlorobenzene. Preferably, however, the quinone of the formula (4) is employed in a greater or lesser excess, which as a rule is 5–20%, but also, depending on the quinone chosen, can be up to 100%. The reaction according to the invention of the amines (3) with the quinones (4) can be carried out at a temperature between 20° and 100° C., preferably between 50° and 70° C., in the presence of an acid-binding agent, such as, for example, an alkali metal carbonate or acetate or alkaline earth metal carbonate or acetate, thus, for example, sodium acetate, sodium carbonate or sodium bicarbonate, or an alkali metal hydroxide or alkaline earth metal hydroxide, such as sodium hydroxide, or an oxide of an alkaline earth metal, such as, for example, magnesium oxide. If the reaction is carried out in an aqueous or aqueous-organic medium, a pH range between 4 and 7, preferably between 5.5 and 6.5, is established.

The anil of the formula (5) is then cyclized to the triphenodioxazine compound by a procedure which is customary and known per se, preferably under oxidizing conditions and preferably after prior isolation. This reaction can be carried out, for example, in sulfuric acid or sulfuric acid containing sulfuric trioxide, as the medium, oxidizing agents used being sulfur trioxide, ammonium or alkali metal persulfates or sodium borate, but preferably sodium peroxodisulfate or potassium peroxodisulfate (corresponding to the formulae $Na_2S_2O_8$ and $K_2S_2O_8$).

The reaction is preferably carried out in concentrated sulfuric acid, such as 96 to, preferably, 100% strength sulfuric acid, and in particular in sulfuric acid containing sulfur trioxide (oleum), such as up to 30% strength by weight oleum. The reaction temperature is chosen between 5° and 40° C., and if appropriate also up to 80° C., but preferably between 15° and 25° C. and particularly preferably between 20° and 25° C.

If the cyclization is carried out in sulfuric acid or oleum as the reaction medium, hydroxy groups which are bonded to an alkyl radical of the molecule, such as, for example, the β-hydroxyethyl groups of the formula radical Y or hydroxyalkyl groups of the formula radicals R¹ and R² already mentioned above, can be converted into the corresponding sulfatoalkyl groups. If oleum is used, the reaction temperature should not exceed 30° C. At temperatures above about 35° C., such as at temperatures between 40° and 60° C., sulfo groups can also be introduced, according to the invention, into the aromatic rings of the triphendioxazine (including the corresponding aryl radicals of R¹, R², X¹ and X²). The oleum used as the reaction medium and agent as a rule contains 5 to 30% by weight, preferably 10 to 20% by weight, of sulfur trioxide.

Known procedures for reaction of aromatic amines with 1,4-benzoquinones which lead to triphendioxazine compounds are described, for example, in K. Venkataraman, "The Chemistry of Synthetic Dyes", volume V, pages 419–427 (1971), in Ullmanns Encyklopadie der technischen Chemie (Ullmann's Encyclopedia of Industrial Chemistry), 4th edition, volume 8, pages 240+241 (1974) and German Offenlegungsschrift No. 2,823,828.

The starting compounds corresponding to the general formula (3) are not yet known. However, they can be prepared by procedures analogous to the known procedures for reacting nitrochlorobenzenes with amines, thus, for example, by reacting a chloronitrobenzene of the general formula (6)

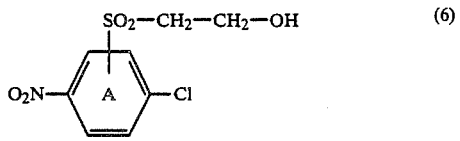

in which A has the meaning given for formula (3), with an amine of the general formula $HNR^1R^2$, where $R^1$ and $R^2$ have the abovementioned meaning, either in an excess of the amine of the formula $HNR^1R^2$ or in water or an organic medium, such as an alkanol, for example methanol, dioxane or toluene, or in a mixture of water and watermiscible organic solvents, with the addition of a basic, acid-binding agent, such as, for example, potassium carbonate, sodium carbonate or sodium hydroxide, at a temperature between 20° and 90° C., preferably between 40° and 70° C. In an aqueous medium, a pH between 6 and 10, preferably between 8 and 9, is maintained. Such procedures are known, for example, from processes for the preparation of p-nitrodiphenylamine-o-sulfonic acid from 2-chloro-5-nitrobenzenesulfonic acid (see, for example, Chem. Ber. 41, 3744 et seq., and 42, 1077 et seq.), which are also used, in the reduced form, as starting compounds for dioxazine dyestuffs.

The nitroaniline compound obtainable in this manner, of the general formula (7)

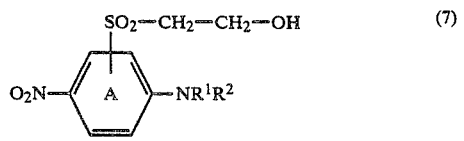

in which A, $R^1$ and $R^2$ have the abovementioned meanings, and A in particular has the meaning given for formula (3), can then be subjected to a synthesis reaction by methods which are customary per se for the reduction of aromatic nitro groups by means of hydrogen and a metallic catalyst, such as a palladium, platinum or Raney nickel catalyst, under pressure in an autoclave, or by means of Bechamp reduction using iron filings, to give the compound corresponding to the general formula (3) in which Y represents the β-hydroxyethyl group. The fiber-reactive starting compounds corresponding to the general formula (3) in which Y represents the vinyl group or an ethyl group which contains, in the β-position, a substituent which can be eliminated by an alkali can be prepared from the 2-(β-hydroxyethylsulfonyl)-1,4-phenylene-diamine compound corresponding to the general formula (3) by the generally known procedure for converting the β-hydroxyethylsulfonyl group into such groups. Preferably, the β-hydroxyethylsulfonyl group is converted into the β-sulfatoethylsulfonyl group.

Particularly advantageously, however, the fiber-reactive starting compounds are not used, as already mentioned above, as starting substances in the preparation of the β-sulfatoethylsulfonyl compounds of the formula (1), and those starting compounds of the general formula (3) in which Y represents the β-hydroxyethyl group are used. These are reacted in the manner according to the invention with a 1,4-benzoquinone of the general formula (4) to give the triphendioxazine, via intermediate isolation of the anil, the resulting triphendioxazine compound with the β-hydroxyethylsulfonyl groups subsequently being esterified (sulfated) by procedures which are customary per se and for which many examples have been described for converting dyestuffs with a β-hydroxyethylsulfonyl group into dyestuffs with a β-sulfatoethylsulfonyl group, for example with 95 to 100% strength sulfuric acid, with chlorosulfonic acid or with sulfuric acid containing sulfur trioxide. In particular, as mentioned above, the sulfation is carried out already before or during the oxidative cyclization by means of sulfuric acid or oleum, which can simultaneously serve as the reaction medium, so that it is not necessary to use starting compounds of the general formula (3) which already contain the β-sulfatoethylsulfonyl group.

Chloronitrobenzene compounds corresponding to the general formula (6) are known (see, for example, German Pat. No. 859,462, Example 5). They can be synthesized by nitration of a corresponding (β-hydroxyethylsulfonyl)chlorobenzene compound by a procedure which is customary per se, or, likewise by a procedure which is known per se, by reduction of a corresponding 1-chloro-4-nitro-benzenesulfonyl chloride compound by means of sodium sulfite to give the corresponding sulfinic acid, and subsequent oxyethylation of the sulfinic acid to the give the β-hydroxyethylsulfonyl compound.

Starting compounds of the general formula (3) are, for example, 3-(β-hydroxyethylsulfonyl)-aniline compounds which are substituted in the 4-position by a (β-hydroxyethyl)-amino group or by a (γ-hydroxypropyl)-amino, a (β-sulfatoethyl)-amino, a (β-sulfatopropyl)-amino, a (β-sulfoethyl)-amino, a bis-(β-sulfatoethyl)-amino or a bis-(β-sulfoethyl)-amino group or by another amino group corresponding to the formula —$NR^1R^2$ given in the following tabular examples, but preferably substituted in the 4-position by a (β-hydroxyethyl)-amino, (γ-hydroxypropyl)amino, (γ-hydroxypropyl)-amino, (β-sulfoethyl)-amino, (γ-sulfo-propyl)-amino, β-(4-sulfophenyl)-ethyl-amino, β-(2,4-disulfophenyl)-ethyl-amino, β-(2-sulfo-4-β-hydroxyethylsulfonyl)-ethyl-amino, bis-(β-hydroxyethyl)-amino, bis-(β-sulfoethyl)-amino, N-methyl-N-(β-hydroxyethyl)amino, N-ethyl-N-(β-hydroxyethyl)-amino, N-methyl-(β-sulfoethyl)-amino or N-ethyl-N-(β-sulfoethyl)-amino group, or especially preferably by a hydroxyalkyl-amino group with 1 to 4 carbon atoms, such as the (β-hydroxyethyl)-, (γ-hydroxypropyl)- or (β-hydroxypropyl)-amino group.

Examples of the benzoquinones of the general formula (4) used as starting compounds are 2-methyl-3,5,6-tribromo-1,4-benzoquinone, 2-methoxy-3,5,6-trichloro-1,4-benzoquinone, 2,3,5,6-tetramethoxy-1,4-benzoquinone, 2,3,5,6-tetraphenoxy-1,4-benzoquinone, 2-methyl- 3,6-dichloro-1,4-benzoquinone and 2,5-dichloro-1,4-benzoquinone, preferably 2,3,5,6-tetrabromo-1,4-benzoquinone and in particular 2,3,5,6-tetrachloro-1,4-benzoquinone.

The compounds of the general formula (1) prepared according to the invention are separated out of and isolated from the synthesis solutions by generally known methods, thus, for example, either by precipitation from the reaction medium by means of electrolytes, such as, for example, sodium chloride or potassium chloride, or by evaporation of the reaction solution, for example by spraydrying, it being possible to add a buffer substance to this reaction solution.

The compounds of the general formula (1) according to the invention have fiber-reactive properties and useful dyestuff properties. They can therefore be used for dyeing (including printing) materials containing hydroxy groups and/or carboxamide groups, for example materials in the form of sheet-like structures, such as paper and leather, or for bulk-dyeing polyamide or polyurethane, and in particular for dyeing such materials in fiber form. The solutions obtained during synthesis of the compounds according to the invention can also be used directly for dyeing as a liquid preparation, if appropriate after addition of a buffer substance and if appropriate also after concentration.

The present invention therefore also relates to the use of the compounds of the general formula (1) according to the invention for the dyeing (including printing) of materials containing hydroxy and/or carboxamide groups, and to processes for their use on these substrates. The materials are preferably used in the form of fiber materials, in particular in the form of textile fibers, such as yarns, wound packages and fabrics. The procedure followed here can be analogous to known procedures.

Materials containing hydroxy groups are those of natural or synthetic origin, such as, for example, cellulose fiber materials or regenerated products and polyvinyl alcohols. Cellulose fiber materials are preferably cotton, but also other vegetable fibers, such as linen, hemp, jute and ramie fibers; examples of regenerated cellulose fibers are stable viscose and filament viscose.

Examples of materials containing carboxamide groups are synthetic and natural polyamides and polyurethanes, in particular in the form of fibers, such as wool and other animal hair, silk, leather, polyamide-6,6, polyamide-6, polyamide-11 and polyamide-4.

The compounds of the formula (1) according to the invention can be applied to and fixed on, by the use according to the invention, the substrates mentioned, in particular the fiber materials mentioned, by the application techniques known for water-soluble, in particular fiber-reactive, dyestuffs, thus, for example, by applying the dioxazine compound of the general formula (1) in dissolved form to the substrate or introducing it into the substrate and fixing it on the substrate or in the substrate, if appropriate by the action of heat and/or if appropriate by the action of an alkaline agent. Such dyeing and fixing procedures are described in numerous instances in the literature.

Thus, very good color yields and a good color build-up are obtained with them on cellulose fibers by the exhaustion processes from a long liquor using the most diverse acid-binding agents and, if appropriate, neutral salts, such as sodium chloride or sodium sulfate. Dyeing is preferably carried out in an aqueous bath at temperatures between 40° and 100° C., if appropriate at temperatures up to 120° C., under pressure and if appropriate in the presence of customary dyeing auxiliaries.

A procedure can be followed here in which the material is introduced into the warm bath, this is gradually warmed to the desired dyeing temperature and the dyeing process is brought to completion at this temperature. The neutral salts which accelerate exhaustion of the dyestuff can, if desired, also be added to the bath only when the actual dyeing temperature has been reached.

Excellent color yields and a very good color buildup are also obtained on cellulose fibers by the padding process, and fixing can be carried out by batching at room temperature or elevated temperature, for example up to about 60° C., by steaming or using dry heat in the customary manner.

Deep prints with a good sharpness of contours and a clear white ground can likewise obtained by the printing processes customary for cellulose fibers, which can be carried out as one-stage processes, for example by printing by means of a printing paste containing the compound according to the invention and sodium bicarbonate or another acid-binding agent and subsequent steaming at 100° to 103° C., or as two-stage processes, for example by printing by means of a neutral or weakly acid printing paste containing the compound according to the invention and subsequent fixing of the compound according to the invention, either by passing the printed material through a hot bath containing alkali and electrolyte, or by over-padding with an alkaline padding liquor containing electrolyte and then batching this over-padded material or steaming or treatment with dry heat. The result of printing depends only slightly on the varying fixing conditions.

In the case of fixing by means of dry heat by the customary thermofixing processes, hot air of 120° to 200° C. is used. Besides the usual steam of 101° to 103° C., it is also possible to use superheated steam and compressed steam with temperatures of up to 160° C.

The degrees of fixing obtained with the dioxazine compounds according to the invention are high both in dyeing and in printing.

Examples of agents which effect acid-binding and fixing of the compound of the formula (1) to the cellulose fibers are water-soluble basic salts of alkali metals and alkaline earth metals of organic or inorganic acids, or compounds which liberate alkali under the influence of heat. Compounds which may be mentioned in particular are the alkali metal hydroxides and alkali metal salts of weak to moderate-strength inorganic or organic acids, preferably their sodium and potassium compounds. Examples of such acid-binding agents are sodium hydroxide, potassium hydroxide, sodium carbonate, sodium bicarbonate, potassium carbonate, sodium formate, sodium dihydrogen phosphate, disodium hydrogen phosphate, sodium trichloroacetate, water-glass and trisodium phosphate.

By treating the compounds (dyestuffs) according to the invention with the acid-binding agents, if appropriate under the influence of heat, the dyestuffs according to the invention are bonded chemically to the cellulose fibers; following customary after-treatment by rinsing to remove non-fixed portions of dyestuffs, the dyeings on cellulose in particular exhibit excellent wet-fastness properties, especially since non-fixed portions of dyestuff can easily be washed out.

The dyeings on polyurethane or natural or synthetic polyamide fibers are usually obtained from an acid medium. Thus, for example, acetic acid and/or ammonium sulfate and/or acetic acid and ammonium acetate can be added to the dyebath in order to obtain the desired pH. In order to achieve a useful levelness of the dyeing, it is advisable to add customary leveling auxiliaries, such as, for example, those based on a reaction product of cyanuric chloride with three times the molar amount of an aminobenzenesulfonic acid and/or an aminonaphthalenesulfonic acid, or based on a reaction product of, for example, stearylamine with ethylene oxide. As a rule, the material to be dyed is introduced into the bath at a temperature of about 40° C. and is agitated in the bath for some time, the dyebath is then adjusted to the desired weakly acid, preferably weakly acetic acid, pH, such as a pH of between 3.5 and 5.5, and the actual dyeing is carried out at a emperature of between 60° and 98° C., while monitoring this pH. The dyeings can, however, also be produced at the boiling point or at temperatures up to 106° C. or up to 120° C. (under pressure). Towards the end of the dyeing time, the pH can be shifted to the neutral or, if appropriate, weakly alkaline range, up to a pH of 8.5, in order to bring about the complete reactive bonding between the dyestuff of the formula (1) and the fiber, especially if the intention is to achieve good depth of color. At the same time, the portion of dyestuff which has not been reactively bonded is removed.

The dyeings and prints produced with the compounds of the general formula (1) according to the invention are distinguished by clear, chiefly blue color shades. In particular, the dyeings and prints on cellulose fiber materials have very good depth of color and also very good light-fastness properties, including good fastness to light when wet and under the influence of perspiration, and also good fastness to hypochlorite bleaching and to chlorinated water, and furthermore excellent wet-fastness properties, such as, for example, good to very good fastness to washing at 60° to 95° C., also in the presence of perborates, fastness to acid and alkaline milling, overdyeing and perspiration, fastness to alkali, acid, water and sea water and furthermore a good fastness to pleating, ironing and rubbing. They also have a good fastness when lying under wet conditions, and a good stability towards acid storage ("acid fading"), when moist dyed material which still contains acetic acid is stored. Moreover, the dyeings are stable towards the customary synthetic resin finishes. Some of the compounds (dyestuffs) according to the invention are comparable in the purity of the color shade and in important dyestuff properties to fiber-reactive anthraquinone dyestuffs.

The use according to the invention of compounds of the formula (1) for fiber-reactive dyeing of wool is also of importance. In particular, wool which has been provided with a non-felting or low-felting finish (cf., for example, H. Rath, Lehrbuch der Textilchemie (Textbook of Textile Chemistry), Springer-Verlag, 3rd edition (1972), pages 295–299, in particular finishing by the so-called Hercosett process (page 298); J. Soc. Dyers and Colourists 1972, 93–99, and 1975, 33–44) can also be dyed with very good fastness properties.

Since the water-solubility of the compounds of the general formula (1) is very good, they can also be advantageously employed in the customary continuous dyeing processes.

The tinctorial strength of the compounds of the general formula (1) according to the invention is also very high on wool and polyamide fiber materials. On these fiber materials, especially in the reactive dyeing of wool, they give clear, chiefly blue dyeings. High exhaustion of the bath is to be found when dyeing temperatures of 100° to 106° C. are used.

Ammoniacal after-treatment of the dyed goods which is otherwise customary can be dispensed with in the case of the dyeings obtainable with the compounds of the general formula (1) according to the invention. In comparison with structurally similar, known dyestuffs, they surprisingly exhibit a very good color build-up, the brilliant hue being retained in deep shades. Moreover, they can readily be combined with other fiber-reactive dyestuffs for wool, which enable surprisingly level dyeing of the fibers. Material from wool fibers of different origin can also be subjected to level dyeing with the compound according to the invention. If appropriate, a customary leveling auxiliary, such as, for example, N-methyltaurine, can be added to improve the leveling properties.

By using the customary dyeing auxiliaries which have an affinity for fibers, the compounds according to the invention also give level dyeings on wool which has been provided with a non-felting or low-felting finish. A very good level of wet-fastness is to be achieved with light to moderate depths of color, even without ammoniacal after-treatment, but ammoniacal after-treatment may in some cases be preferred. Besides the high light-fastness of these dyeings on wool, the very good wet-fastness properties, in particular the excellent fastness to alkaline perspiration and very good fastness to washing at 60° C., even of dyeings with good depth of color, are to be mentioned.

The following examples serve to illustrate the invention. The parts are parts by weight and the percentages are percentages by weight, unless indicated otherwise. Parts by weight bear the same relationship to parts by volume as that of the kilogram to the liter.

The compounds described by way of their formulae in these examples are shown in the form of the free acids; in general, they are prepared and isolated in the form of their sodium or potassium salts and used for dyeing in the form of their salts. The starting compounds and components given in the form of the free acid in the following examples, in particular the tabular examples, can also be employed in the synthesis as such or in the form of their salts, preferably alkali metal salts, such as sodium or potassium salts.

EXAMPLE 1

(a) 520 parts of 3-($\beta$-hydroxyethylsulfonyl)-4-($\beta$-hydroxyethylamino)-aniline are dissolved in 6000 parts of water at 65° C. to give a clear solution. 248 parts of chloranil are introduced and a pH of 6 to 6.5 is maintained at a reaction temperature of about 65° C. throughout the reaction with about 180 parts of sodium bicarbonate. The batch is subsequently stirred for a further hour and the reaction product is filtered off with suction at about 60° C., washed with 4000 parts of water and dried under reduced pressure at 70° C. (b) 693 parts of the anil intermediate obtained under (a) are introduced into 5000 parts of 10% strength oleum at a temperature between 20° and 25° C. The reaction batch is then subsequently stirred at this temperature for about a further 3 hours; 481 parts of sodium peroxodisulfate are then introduced, and in particular in a manner such that the reaction temperature can be kept at 20 to 25° C. The batch is subsequently stirred at this temperature for a further 15 hours, and is then poured onto ice and brought to a pH of between 1 and 1.5 with calcium carbonate and then to a pH of 5.5 with sodium carbonate, the calcium sulfate which has precipitated is filtered off and washed with water and the filtrates are combined.

The triphendioxazine compound according to the invention can be obtained in the form of its sodium salt by evaporation or spray-drying of the combined filtrate. It has the probable formula, written in the form of the free acid,

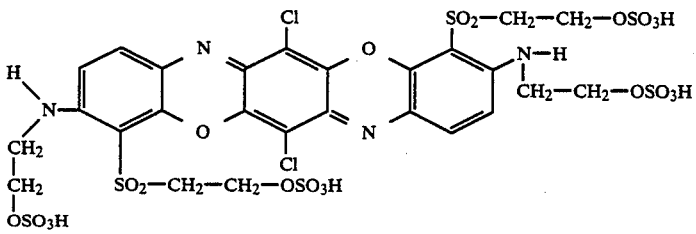

(the particular β-sulfatoethylsulfonyl group can also be bonded in the other ortho-position relative to the (β-sulfatoethyl)-amino group, but is more probably in the position shown by the above formula, in each case in the ortho-position relative to the dioxazine nitrogen atom and amino nitrogen atom).

This compound according to the invention has very good fiber-reactive dyestuff properties. It dyes the materials mentioned in the description, in particular cellulose fiber materials, such as cotton, by the procedures customary and known in the art for application and fixing of fiber-reactive dyestuffs, in deep, clear reddish-tinged blue shades with good fastness properties, in particular good light-fastness of the dry or moist dyeing, such as the dyeing moistened with drinking water, good fastness to light under the influence of alkaline perspiration, fastness to chlorinated water, fastness to hypochlorite, fastness to alkaline perspiration, fastness to washing, also in the presence of perborates, fastness to lying under wet conditions and stability to acid storage.

In aqueous solution, it has an absorption maximum at 610 nm in the visible range.

(c) The aniline compound employed under (a) can be prepared, for example, as follows:

132.8 parts of 2-(β-hydroxyethylsulfonyl)-4-nitrochlorobenzene are slowly added to a solution of 76.5 parts of ethanolamine in 500 parts by volume of methanol at a temperature of 65° C. and the reaction batch is further stirred at this temperature for another 6 hours.

400 parts by volume of methanol are then distilled off from the reaction batch, with simultaneous continuous addition of water. On cooling, highly pure 2-(β-hydroxyethylsulfonyl)-4-nitro-1-(β-hydroxyethyl)-amino-benzene crystallizes out of the now aqueous medium. This compound can be used in the catalytic hydrogenation for conversion of the nitro group into the amino group. For this, 58 parts of this nitro compound are dissolved in 400 parts by volume of methanol and are hydrogenated in the presence of a nickel catalyst in an autoclave at a temperature of 100° C. under a pressure of 50 bar of hydrogen. The catalyst is then filtered off and the filtrate is allowed to crystallize out by cooling the methanolic solution. The 3-(β-hydroxyethylsulfonyl)-4-(β-hydroxyethylamino)-aniline is obtained in a good yield and high purity.

EXAMPLE 2

The triphendioxazine compound, according to the invention, of Example 1 can also be prepared in the following manner: (a) 260 parts of 3-(β-hydroxyethylsulfonyl)-4-(β-hydroxyethylamino)-aniline, 57.5 parts of magnesium oxide and 124 parts of 2,3,5,6-tetrachloro-1,4-benzoquinone are suspended in 1500 parts of water.

The suspension is warmed to 65° C., stirring is continued at this temperature for a further 2 to 5 hours and the suspension is then cooled to 20° C. The dark brown reaction product is filtered off, washed with water and dried at 60° C. (b) For the purpose of sulfation of the β-hydroxyethyl groups to β-sulfatoethyl groups and cyclization to the triphendioxazine compound, 693 parts of the condensation product (anil compound) obtained under (a) are introduced with stirring into 4000 parts of 20% strength oleum, and in particular in a manner such that the reaction temperature can be kept at 18° to 20° C. The further procedure is as according to the procedure described in Example 1.

The triphendioxazine compound according to the invention obtained by this example, with the (probable) formula given in Example 1, has the same good fiber-reactive dyestuff properties as described in Example 1.

EXAMPLE 3

(a) 274 parts of 3-(β-hydroxyethylsulfonyl)-4-(γ-hydroxypropylamino)-aniline are dissolved in 3000 parts of water at 65° C. to give a clear solution. 126 parts of chloranil are introduced and a pH of 6 to 6.5 is maintained at a reaction temperature of about 65° C. during the reaction using about 90 parts of sodium bicarbonate. The batch is subsequently stirred for a further hour and the reaction product is filtered off with suction, after cooling, washed with 2000 parts of water and dried under reduced pressure at 70° C.

(b) 360 parts of the anil intermediate obtained under (a) are introduced into 3000 parts of 10% strength oleum at a temperature between 20° and 25° C. 240 parts of sodium peroxodisulfate are then added, and in particular in a manner such that the reaction temperature can be kept at 20° to 25° C. The mixture is subsequently stirred at this temperature for a further 15 hours, the batch is then poured onto ice and brought to a pH of between 1 and 1.5 with calcium carbonate and then to a pH of 6 with sodium carbonate, the calcium sulfate precipitated is filtered off and washed out with water and the filtrates are combined.

The triphendioxazine compound according to the invention can be obtained in the form of its sodium salt by evaporation or spray-drying of the combined filtrate. It has the probable formula, written in the form of the free acid

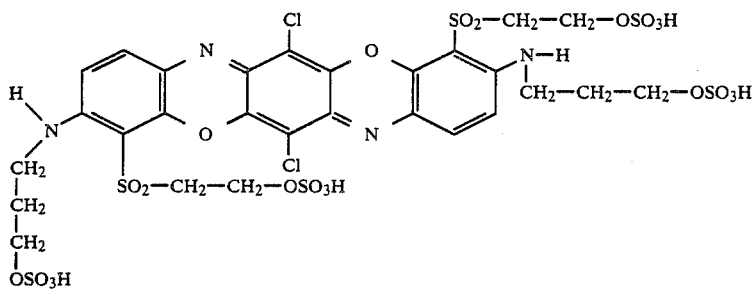

(The particular β-sulfatoethylsulfonyl group can also be bonded in the other ortho-position relative to the (γsulfatopropyl)-amino group, but is more probably in the position shown by the above formula, in each case in the ortho-position relative to the dioxazine oxygen atom and amino nitrogen atom).

This compound according to the invention has very good fiber-reactive dyestuff properties. It dyes the materials mentioned in the description, in particular cellulose fiber materials, such as cotton, by the procedures customary and known in the art for application and fixing of fiber-reactive dyestuffs, in deep, clear reddish-tinged blue shades with good fastness properties, such as, in particular, good fastness to light of the dry or moist dyeing, such as the dyeing moistened with drinking water, good fastness to light under the influence of alkaline perspiration, fastness to chlorinated water, fastness to hypochlorite, fastness to alkaline perspiration, fastness to washing, also in the presence of perborates, fastness to lying under wet conditions and stability to acid storage.

In aqueous solution, it exhibits an absorption maximum at 615 nm in the visible range.

EXAMPLE 4

(a) 274 parts of 3-(β-hydroxyethylsulfonyl)-4-(β-hydroxypropylamino)-aniline are dissolved in 3000 parts of water at 65° C. to give a clear solution. 124 parts of chloranil are introduced and a pH of 6 to 6.5 is maintained at a reaction temperature of about 65° C. during the reaction using about 60 parts of sodium carbonate. The batch is subsequently stirred for about a further 3 hours and the reaction product is filtered off with suction, after cooling, washed with 2000 parts of water and dried under reduced pressure at 70° C.

(b) 360 parts of the anil intermediate obtained under (a) are introduced into 2500 parts of 15% strength oleum at a temperature between 20° and 25° C. The reaction batch is then subsequently stirred at this temperature for about a further 15 hours; 240 parts of sodium peroxodisulfate are then introduced, and in particular in a manner such that the reaction temperature can be kept at 20° to 25° C. The batch is subsequently stirred at this temperature for a further 10 hours and is then poured onto ice and brought to a pH of between 1 and 1.5 with calcium carbonate and then to a pH of 6 with sodium carbonate, the calcium sulfate precipitated is filtered off and washed out with water and the filtrates are combined. Precipitation with oxalic acid can be carried out to remove calcium ions.

The triphendioxazine compound according to the invention can be obtained in the form of its sodium salt by evaporation or spray-drying of the combined filtrate. It has the probable formula, written in the form of the free acid

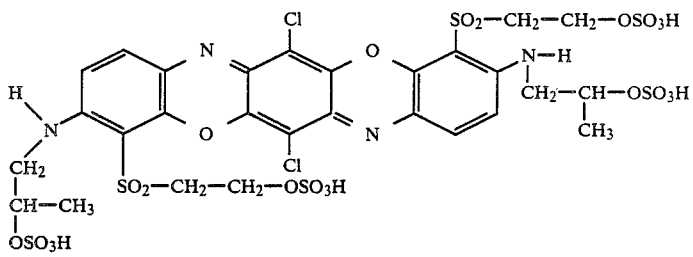

(the particular β-sulfatoethylsulfonyl group can also be bonded in the other ortho-position relative to the (β-sulfatopropyl)-amino group, but is more probably in the position shown by the above formula, in each case in the ortho-position relative to the dioxazine oxygen atom and amino nitrogen atom).

This compound according to the invention has very good fiber-reactive dyestuff properties. It dyes the materials mentioned in the description, in particular cellulose fiber materials, such as cotton, by the procedures known and customary in the art for application and fixing of fiber-reactive dyestuffs, in deep, clear reddish-tinged blue shades with good fastness properties, such as, in particular, good fastness to light of the dry and moist dyeing, such as the dyeing moistened with drinking water, good fastness to light under the influence of alkaline perspiration, fastness to chlorinated water, fastness to hypochlorite, fastness to alkaline perspiration, fastness to washing, also in the presence of perborates, fastness to lying under wet conditions and stability to acid storage.

In aqueous solution, it exhibits an absorption maximum at 610 nm in the visible range.

EXAMPLES 5 TO 30

Further triphendioxazine compounds, according to the invention, corresponding to a general formula (1a) and the corresponding formula radical $R^2$ are described in the following tabular examples. They can be prepared in the manner according to the invention, for example analogously to the above embodiment Examples 1 to 4, by reaction of chloranil with an aniline compound corresponding to the general formula (3a), where R'$_2$ has the meaning given in the particular tabular example, and subsequent sulfation and cyclization. These triphendioxazine compounds according to the invention likewise have very good fiber-reactive dyestuff properties and, on the materials mentioned in the description, such as, in particular, cellulose fiber materials, give deep, fast dyeings with the color shade on cotton stated in the particular tabular example. The absorption maxima (λ max in nm) were determined from aqueous solution.

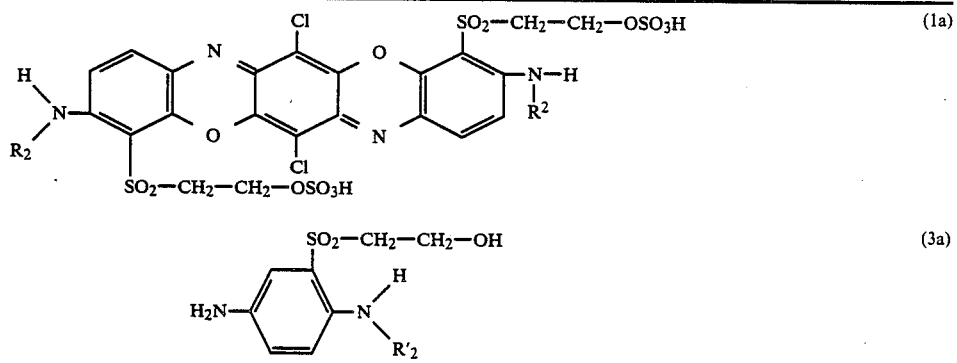

| Example | Compound of the formula (1a) where R$^2$ is ... | Starting amine (3a) where R'$_2$ is ... | Color shade (λ$_{max}$) |
|---|---|---|---|
| 5 | Chloro-2-sulfato-propyl | 3-Chloro-2-sulfato-propyl | reddish-tinged blue(615) |
| 6 | 2-Sulfato-isopropyl | 2-Hydroxy-isopropyl | reddish-tinged blue(615) |
| 7 | Sulfato-tert.-butyl | Hydroxy-tert.-butyl | reddish-tinged blue(615) |
| 8 | 4-Sulfato-butyl | 4-Hydroxy-butyl | reddish-tinged blue(615) |
| 9 | 3-Sulfato-butyl | 3-Hydroxy-butyl | reddish-tinged blue(615) |
| 10 | 3-Sulfato-2-methyl-propyl | 3-Hydroxy-2-methyl-propyl | reddish-tinged blue(615) |
| 11 | 3-Sulfato-1-methyl-propyl | 3-Hydroxy-1-methyl-propyl | reddish-tinged blue(615) |
| 12 | 1-(Sulfatomethyl)-propyl | 1-(Hydroxymethyl)-propyl | reddish-tinged blue(617) |
| 13 | 2-Sulfato-1-methyl-propyl | 2-Hydroxy-1-methyl-propyl | reddish-tinged blue(617) |
| 14 | 2-Sulfato-butyl | 2-Hydroxy-butyl | reddish-tinged blue(617) |
| 15 | 2-Sulfato-2-methyl-propyl | 2-Hydroxy-2-methyl-propyl | reddish-tinged blue(617) |
| 16 | 5-Sulfato-pentyl | 5-Hydroxy-pentyl | reddish-tinged blue(617) |
| 17 | 3-Sulfato-1-ethyl-propyl | 3-Hydroxy-1-ethyl-propyl | reddish-tinged blue(617) |
| 18 | 1-(Sulfatomethyl)-butyl | 1-(Hydroxymethyl)-butyl | Reddish-tinged blue(617) |
| 19 | 4-Sulfato-2-methyl-butyl | 4-Hydroxy-2-methyl-butyl | Reddish-tinged blue(617) |
| 20 | 2-Sulfato-1,2-dimethyl-propyl | 2-Hydroxy-1,2-dimethyl-propyl | Reddish-tinged blue(617) |
| 21 | 2-Sulfato-1,1,2-trimethyl-propyl | 2-Hydroxy-1,1,2-trimethyl-propyl | Reddish-tinged blue(617) |
| 22 | 3-Sulfato-1,3,3-trimethyl-propyl | 3-Hydroxy-1,3,3-trimethyl-propyl | Reddish-tinged blue(617) |
| 23 | 2-Sulfato-2,5-dimethyl-pentyl | 2-Hydroxy-2,5-dimethyl-pentyl | Reddish-tinged blue(617) |
| 24 | 1-(2'-Sulfatoethyl)-butyl | 1-(2'-Hydroxyethyl)-butyl | Reddish-tinged blue(617) |
| 25 | 4-Sulfato-1-methyl-butyl | 4-Hydroxy-1-methyl-butyl | Reddish-tinged blue(617) |
| 26 | 2,3-Disulfato-propyl | 2,3-Hydroxy-propyl | Reddish-tinged blue(612) |
| 27 | 1-(Sulfatomethyl)-2-sulfato-ethyl | 1,3-Dihydroxy-propyl(2) | Reddish-tinged blue(612) |
| 28 | 1,1-Bis-(sulfatomethyl)-ethyl | 1,1-Bis(hydroxymethyl)-ethyl | Reddish-tinged blue(612) |
| 29 | 2-(β-Sulfatoethylsulfonyl)-ethyl | 2-(β-Hydroxyethylsulfonyl)-ethyl | Reddish-tinged blue(612) |
| 30 | 2-(2'-Sulfo-4'-β-sulfato-ethylsulfonyl-phenyl)-ethyl | 2-(2'-Sulfo-4'-β-hydroxy-ethylsulfonyl-phenyl)-ethyl | Reddish-tinged blue(612) |
| 30a | 3-Sulfato-2,2-dimethyl-propyl | 3-Hydroxy-2,2-dimethyl-propyl | Reddish-tinged |

-continued

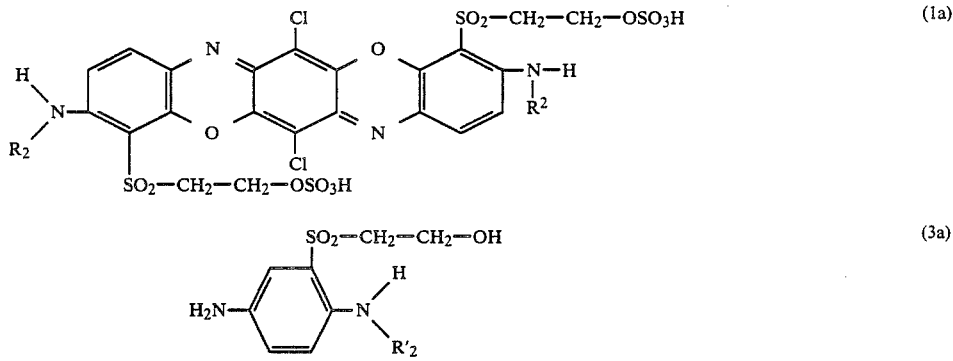

$H_2N$—⬡—$SO_2$—$CH_2$—$CH_2$—OH, N(H)(R'$_2$)  (3a)

| Example | Compound of the formula (1a) where $R^2$ is ... | Starting amine (3a) where $R'_2$ is ... | Color shade ($\lambda_{max}$) |
|---|---|---|---|
| 30b | 2-(4'-β-Sulfatoethylsulfonyl-phenyl)-ethyl | 2-(4'-β-Hydroxyethylsulfonyl-phenyl)-ethyl | blue(612) Reddish-tinged blue(612) |
| 30c | 2-Sulfato-1-carboxy-ethyl | 2-Hydroxy-1-carboxy-ethyl | Reddish-tinged blue(612) |

EXAMPLES 31 TO 65

Further triphendioxazine compounds, according to the invention, corresponding to a general formula (1a) with the corresponding formula radicals $R^2$ are described in the following tabular examples. They can be prepared in the manner according to the invention, for example analogously to the above embodiment Examples 1 to 4, by reaction of chloranil with an aniline compound corresponding to the general formula (3) in which Y is the β-sulfatoethyl or β-hydroxyethyl group, the group —$SO_2$—Y is in the ortho-position relative to the amino group —$NR^1R^2$, $R^1$ is a hydrogen atom and $R^2$ has the meaning given for formula (1a) in the particular tabular example, and subsequent oxidative cyclization and sulfation of the β-hydroxyethylsulfonyl group. These triphendioxazine compounds according to the invention likewise have very good fiber-reactive dyestuff properties, and on the materials mentioned in the description, such as, in particular, cellulose fiber materials, give deep, fast dyeings with the color shade on cotton given in the particular tabular example.

| Example | Compound of the formula (1a) where $R^2$ is ... | Color shade ($\lambda_{max}$) |
|---|---|---|
| 31 | 2-Sulfo-ethyl | reddish-tinged blue (613) |
| 32 | 3-Sulfo-propyl | reddish-tinged blue (613) |
| 33 | 2-Sulfo-propyl | reddish-tinged blue (613) |
| 34 | 2-Sulfo-butyl | reddish-tinged blue (613) |
| 35 | 3-Sulfo-1-methyl-butyl | reddish-tinged blue (613) |
| 36 | Carboxy-methyl | reddish-tinged blue (613) |
| 37 | 1-Carboxy-ethyl | reddish-tinged blue (613) |
| 38 | 2-Carboxy-ethyl | reddish-tinged blue (613) |
| 39 | 3-Carboxy-propyl | reddish-tinged blue (613) |
| 40 | 5-Carboxy-pentyl | reddish-tinged blue (613) |
| 41 | α-Carboxy-isopropyl | reddish-tinged blue (613) |
| 42 | 1-Carboxy-propyl | reddish-tinged blue |
| 43 | 1-Carboxy-2-sulfo-ethyl | reddish-tinged blue |
| 44 | 2-Carboxy-2-sulfo-ethyl | reddish-tinged blue |
| 45 | 3-Carboxy-3-sulfo-propyl | reddish-tinged blue |
| 46 | 2-(4-Sulfophenyl)-ethyl | reddish-tinged blue |
| 47 | 2-(2,4-Disulfophenyl)-ethyl | reddish-tinged blue |
| 48 | 3-Sulfo-phenyl | reddish-tinged blue |
| 49 | 4-Amino-3-sulfo-phenyl | reddish-tinged blue |
| 49a | 4-Dimethylamino-3-sulfo-phenyl | reddish-tinged blue |
| 50 | 4-Acetylamino-3-sulfo-phenyl | reddish-tinged blue |
| 51 | 4-Carboxy-phenyl | reddish-tinged blue |
| 52 | 4-Sulfo-benzyl | reddish-tinged blue |
| 53 | Hydrogen | reddish-tinged blue |
| 54 | Methyl | reddish-tinged blue |
| 55 | Ethyl | reddish-tinged blue |
| 56 | Propyl | reddish-tinged blue |
| 57 | Phenyl | reddish-tinged blue |
| 58 | Benzyl | reddish-tinged blue |
| 59 | Phenethyl | reddish-tinged blue |
| 60 | 2-Acetylamino-ethyl | reddish-tinged blue |
| 61 | 3-Methylamino-propyl | reddish-tinged blue |
| 62 | 2-Chloro-ethyl | reddish-tinged blue |
| 63 | 4-Acetylamino-phenyl | reddish-tinged blue |
| 64 | 2-Ethoxy-ethyl | reddish-tinged blue |
| 65 | 4-Amino-cyclohexyl | reddish-tinged |

-continued

| Example | Compound of the formula (1a) where $R^2$ is ... | Color shade ($\lambda_{max}$) |
|---|---|---|
| | | blue |

EXAMPLES 66 TO 81

Further triphendioxazine compounds, according to the invention, corresponding to a general formula (1b)

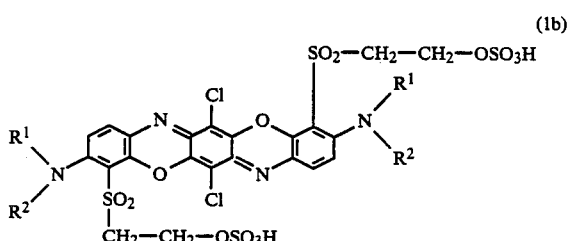
(1b)

with the correspondigg formula radicals $R^1$ and $R^2$ are described in the following tabular examples. They can be prepared in the manner according to the invention, for example analogously to the above embodiment Examples 1 to 4, by reaction of chloranil with an aniline compound corresponding to the general formula (3b)

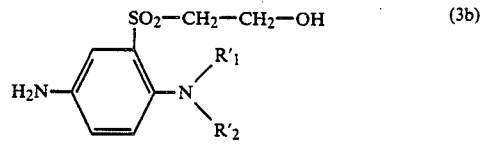
(3b)

where $R'_1$ and $R'_2$ have the meaning given in the particular tabular example, and subsequent sulfation and cyclization. These triphendioxazine compounds according to the invention likewise have very good fiber-reactive dyestuff properties and, on the materials mentioned in the description, such as, in particular, cellulose fiber materials, give deep, fast dyeings with the color shade on cotton given in the particular tabular example.

| Example | Compound of the formula (1b) where $R^1$ is ... | where $R^2$ is ... | Compound of the formula (3b) where $R'_1$ is ... | where $R'_2$ is ... | Color shade |
|---|---|---|---|---|---|
| 66 | Methyl | 2-Sulfato-ethyl | Methyl | 2-Hydroxy-ethyl | reddish-tinged blue |
| 67 | Ethyl | " | Ethyl | " | reddish-tinged blue |
| 68 | 2-Sulfato-ethyl | " | 2-Hydroxy-ethyl | " | reddish-tinged blue |
| 69 | ω-Sulfato-isopropyl | ω-Sulfato-isopropyl | ω-Hydroxy-isopropyl | ω-Hydroxy-isopropyl | reddish-tinged blue |
| 70 | 2-Sulfato-propyl | 2-Sulfato-propyl | 2-Hydroxy-propyl | 2-Hydroxy-propyl | reddish-tinged blue |
| 71 | 2-Sulfo-ethyl | 2-Sulfo-ethyl | 2-Sulfo-ethyl | 2-Sulfo-ethyl | reddish-tinged blue |
| 72 | Methyl | 2-Sulfo-ethyl | Methyl | 2-Sulfo-ethyl | reddish-tinged blue |
| 73 | Ethyl | 2-Sulfo-ethyl | Ethyl | 2-Sulfo-ethyl | reddish-tinged blue |
| 74 | Carboxymethyl | Carboxymethyl | Carboxymethyl | Carboxymethyl | reddish-tinged blue |
| 75 | Methyl | Carboxymethyl | Methyl | Carboxymethyl | reddish-tinged blue |
| 76 | Methyl | Methyl | Methyl | Methyl | reddish-tinged blue |
| 77 | 2-Ethoxy-ethyl | 2-Ethoxy-ethyl | 2-Ethoxy-ethyl | 2-Ethoxy-ethyl | reddish-tinged blue |
| 78 | —$NR^1R^2$ is Piperidino | | —$NR'_1R'_2$ is Piperidino | | reddish-tinged blue |
| 79 | —$NR^1R^2$ is Morpholino | | —$NR'_1R'_2$ is Morpholino | | reddish-tinged blue |
| 80 | 3-Sulfato-propyl | 3-Sulfato-propyl | 3-Hydroxy-propyl | 3-Hydroxy-propyl | reddish-tinged blue |
| 81 | Methyl | Sulfomethyl | Methyl | Sulfomethyl | reddish-tinged blue |

EXAMPLE 82

(a) 260 parts of 3-(β-hydroxyethylsulfonyl)-4-(β-hydroxyethylamino)-aniline, 57.5 parts of magnesium oxide and 118 parts of 2-methyl-3,5,6-trichloro-1,4-benzoquinone are suspended in 2500 parts of water. The suspension is warmed to 65° C. and is further stirred at this temperature for another 2 to 5 hours and then cooled to 20° C. The dark brown reaction product is filtered off, washed with water and dried at 60° C. (b) For the purpose of sulfation of the β-hydroxyethyl groups to give β-sulfatoethyl groups and a cyclization reaction to give the triphendioxazine compound, 670 parts of the condensation product (anil compound) obtained under (a) are introduced into 5000 parts of 20% strength oleum, with stirring, and in particular in a manner such that the reaction temperature can be kept at 18° to 20° C. The reaction batch is then subsequently stirred at this temperature for a further one to three hours and 481 parts of sodium peroxodisulfate are then introduced, and in particular in a manner such that the reaction temperature can be kept at 20° to 23° C. The batch is subsequently stirred at this temperature for a further 15 hours and is then poured onto ice and brought to a pH of between 1 and 1.5 with calcium carbonate and then to a pH of 6 with sodium carbonate, the calcium sulfate precipitated is filtered off and washed out with water and the filtrates are combined.

The triphendioxazine compound according to the invention can be obtained in the form of its sodium salt by evaporation or spray-drying of the combined filtrate. It has the probable formula, written in the form of the free acid,

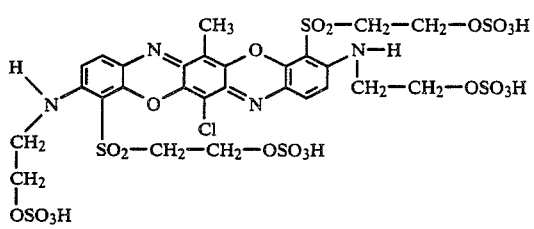

the particular β-sulfatoethylsulfonyl group can also be bonded in the other ortho-position relative to the (β-sulfatoethyl)-amino group, but is more probably in the position shown by the above formula, in each case in the ortho-position relative to the dioxazine oxygen atom and aminonitrogen atom).

This compound according to the invention has very good fiber-reactive dyestuff properties. It dyes the materials mentioned in the description, in particular cellulose fiber materials, such as cotton, by the procedures customary and known in the art for application and fixing of fiber-reactive dyestuffs, in deep, clear reddish-tinged blue shades with good fastness properties, such as, in particular, good fastness to light, fastness to light when wet, fastness to light under the influence of alkaline perspiration, fastness to chlorinated water, fastness to hypochlorite bleaching, fastness to alkaline perspiration and stability to alkali.

EXAMPLES 83 TO 93

Further triphendioxazine compounds, according to the invention, corresponding to the general formula (1c)

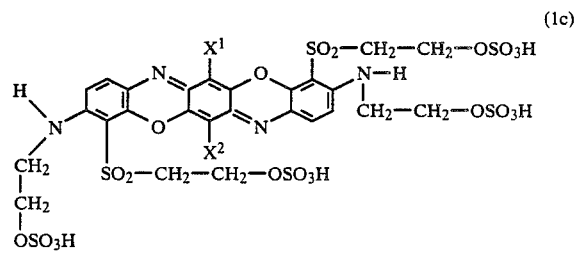

where $X^1$ and $X^2$ have the meanings given, are described in the following tabular examples. They can be prepared in the manner according to the invention, for example analogously to the above embodiment example 82, by reaction of 3-(β-hydroxyethylsulfonyl)-4-(β-hydroxyethylamino)aniline and a benzoquinone compound corresponding to the general formula (4), and subsequent sulfation and cyclization. These triphendioxazin compounds according to the invention likewise have very good fiber-reactive dyestuff properties and, on the materials mentioned in the description, such as, in particular, cellulose fiber materials, give deep, fast dyeings with the color shade on cotton given in the particular tabular example.

| Example | Compound of the formula (1c) where $X^1$ is ... | where $X^2$ is ... | Benzoquinone corresponding to the general formula (4) | Color shade |
| --- | --- | --- | --- | --- |
| 83 | Bromine | Bromine | 2,3,5,6-Tetrabromo-1,4-benzoquinone | reddish-tinged blue |
| 84 | Methyl | Methyl | 2,5-Dimethyl-3,6-dichloro-1,4-benzoquinone | reddish-tinged blue |
| 85 | Methoxy | Methoxy | 2,3,5,6-Tetramethoxy-1,4-benzoquinone | reddish-tinged blue |
| 86 | Methyl | Hydrogen | 2-Methyl-3,6-dichloro-1,4-benzoquinone | reddish-tinged blue |
| 88 | Hydrogen | Hydrogen | 2,5-Dichloro-1,4-benzoquinone | reddish-tinged blue |
| 89 | Methyl | Bromine | 2-Methyl-3,5,6-tribromo-1,4-benzoquinone | reddish-tinged blue |
| 90 | Methoxy | Chlorine | 2-Methoxy-3,5,6-trichloro-1,4-benzoquinone | reddish-tinged blue |
| 91 | Phenoxy | Phenoxy | 2,3,5,6-Tetraphenoxy-1,4-benzoquinone | reddish-tinged blue |
| 92 | 2-Chlorphenyl | Bromine | 2-(2-Chlorophenyl)-3,5,6-tribromo-1,4-benzoquinone | reddish-tinged blue |
| 92 | Hydrogen | Bromine | 3,5,6-Tribrom o-1,4-benzoquinone | reddish-tinged blue |
| 93 | Acetylamino | Acetylamino | 2,5-Di-(acetylamino)-3,6-dichloro-1,4-benzoquinone | reddish-tinged blue |

EXAMPLES 94 TO 98

Further triphendioxazine compounds, according to the invention, corresponding to a general formula (1d) and the corresponding formula radical $R^2$ are described in the following tabular examples. They can be prepared in the manner according to the invention, for example analogously to the above embodiment examples, by reaction of 2,3,5,6-tetrabromo-1,4-benzoquinone with an aniline compound corresponding to the general formula (3a) given earlier, where $R'_2$ has the meaning given in the particular tabular example, and subsequent sulfation and cyclization. These triphendioxanzine compounds according to the invention likewise have very good fiber-reactive dyestuff properties and, on the materials mentioned in the description, such as, in particular, cellulose fiber materials, give deep, fast dyeings with the color shade on cotton given in the particular tabular example.

| Example | Compound of the formula (1d) where $R^2$ is ... | Color shade |
|---------|------------------------------------------------|-------------|
| 99 | 2-Sulfo-ethyl | reddish-tinged blue |
| 100 | 3-Sulfo-propyl | reddish-tinged blue |
| 101 | Carboxy-methyl | reddish-tinged blue |
| 102 | 2-Carboxy-ethyl | reddish-tinged blue |
| 103 | 2-(4-Sulfophenyl)-ethyl | reddish-tinged blue |
| 104 | 2-(2,4-Disulfophenyl)-ethyl | reddish-tinged blue |

EXAMPLES 105 TO 111

Further triphendioxazine compounds, according to the invention, corresponding to a general formula (1e)

(1d)

Structure showing triphendioxazine compound with Br, $SO_2$—$CH_2$—$CH_2$—$OSO_3H$ substituents and $R^2$, $NH$—$R^2$ amino groups.

| Example | Compound of the formula (1d) where $R^2$ is ... | Starting amine (3a) where $R'_2$ is ... | Color shade |
|---------|----------------------------------------------|--------------------------------------|-------------|
| 94 | 3-Sulfato-propyl | 3-Hydroxy-propyl | reddish-tinged blue |
| 95 | 2-Sulfato-propyl | 2-Hydroxy-propyl | reddish-tinged blue |
| 96 | 2-Sulfato-isopropyl | 2-Hydroxy-isopropyl | reddish-tinged blue |
| 97 | 4-Sulfato-butyl | 4-Hydroxy-butyl | reddish-tinged blue |
| 98 | 2-(2'-Sulfo-4'-β-sulfato-ethylsulfonyl-phenyl)-ethyl | 2-(2'-Sulfo-4'-β-hydroxy-ethylsulfonyl-phenyl)-ethyl | reddish-tinged blue |

EXAMPLES 99 TO 104

Further triphendioxazine compounds, according to the invention, corresponding to a general formula (1d) with the corresponding formula radicals $R^2$ are described in the following tabular examples. They can be prepared in the manner according to the invention, for example analogously to the above embodiment examples, by reaction of 2,3,5,6-tetrabromo-1,4-benzoquinone with an aniline compound corresponding to the general formula (3) in which Y is the β-sulfatoethyl or β-hydroxyethyl group, the group —$SO_2$—Y is in the ortho-position relative to the amino group —$NR^1R^2$, $R^1$ is a hydrogen atom and $R^2$ has the meaning given for formula (1d) in the particular tabular example, and subsequent oxidative cyclization and sulfation of the β-hydroxyethylsulfonyl group. These triphendioxazine compounds according to the invention likewise have very good fiber-reactive dyestuff properties and, on the materials mentioned in the description, such as, in particular, cellulose fiber materials, give deep, fast dyeings with the color shade on cotton given in the particular tabular example.

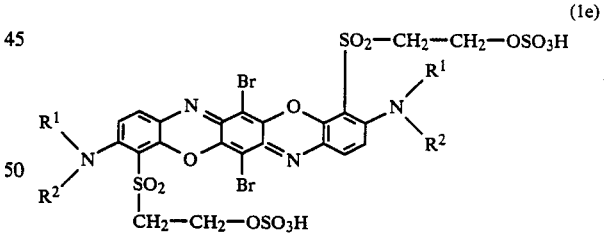

(1e)

with the corresponding formula radicals $R^1$ and $R^2$, are described in the following tabular examples. They can be prepared in the manner according to the invention, for example analogously to the above embodiment examples, by reaction of 2,3,5,6-tetrabromo-1,4-benzoquinone with an aniline compound corresponding to the abovementioned general formula (3b), where $R'_1$ and $R'_2$ have the meaning given in the particular tabular example, and subsequent sulfation and cyclization. These triphendioxazine compounds according to the invention likewise have very good fiber-reactive dyestuff properties and, on the materials mentioned in the description, such as, in particular, cellulose fiber materials, give deep, fast dyeings with the color shade on cotton given in the particular tabular example.

| Ex-ample | Compound of the formula (1e) where R¹ is ... | where R² is | Compound of the formula (3b) where R'₁ is ... | where R'₂ is ... | Color shade |
|---|---|---|---|---|---|
| 106 | Methyl | 2-Sulfato-ethyl | Methyl | 2-Hydroxy-ethyl | reddish-tinged blue |
| 107 | Ethyl | " | Ethyl | " | reddish-tinged blue |
| 108 | 2-Sulfato-ethyl | " | 2-Hydroxy-ethyl | " | reddish-tinged blue |
| 109 | 2-Sulfo-ethyl | 2-Sulfo-ethyl | 2-Sulfo-ethyl | 2-Sulfo-ethyl | reddish-tinged blue |
| 110 | Methyl | 2-Sulfo-ethyl | Methyl | 2-Sulfo-ethyl | reddish-tinged blue |
| 111 | 3-Sulfato-propyl | 3-Sulfato-propyl | 3-Hydroxy-propyl | 3-Hydroxy-propyl | reddish-tinged blue |

EXAMPLES 112 to 116

Further triphendioxaznine compounds, according to the invention, corrsponding to a general formula (1f) and the corresponding formula radical R² are described in the following tabular examples. They can be prepared in the manner according to the invention, for example analogously to the above embodiment examples, by reaction of 2,3,5,6-tetramethoxy-1,4-benzoquinone with an aniline compound corresponding to the general formula (3a) given earlier, where R'₂ has the meaning given in the particular tabular example, and subsequent sulfation and cyclization. These triphendioxazine compounds according to the invention likewise have very good fiber-reactive dyestuff properties and, on the materials mentioned in the description, such as, in particular, cellulose fiber materials, give deep, fast dyeings with the color shade on cotton given in the particular tabular example.

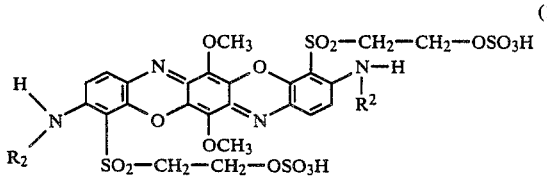

(1f)

| Ex-ample | Compound of the formula (1f) where R² is | Starting amine (3a) where R'₂ is | Color shade |
|---|---|---|---|
| 112 | 3-Sulfato-propyl | 3-Hydroxy-propyl | reddish-tinged blue |
| 113 | 2-Sulfato-propyl | 2-Hydroxy-propyl | reddish-tinged blue |
| 114 | 2-Sulfato-isopropyl | 2-Hydroxy-isopropyl | reddish-tinged blue |
| 115 | 4-Sulfato-butyl | 4-Hydroxy-butyl | reddish-tinged blue |
| 116 | 2-(2'-Sulfo-4'-β-sulfato-ethylsulfonyl-phenyl)-ethyl | 2-(2'-Sulfo-4'-β-hydroxy-ethylsulfonyl-phenyl)-ethyl | reddish-tinged blue |

EXAMPLES 117 TO 122

Further triphendioxazine compounds, according to the invention, corresponding to a general formula (1f) with the corresponding formula radicals R² are described in the following tabular examples. They can be prepared in the manner according to the invention, for example analogously to the above embodiment examples, by reaction of 2,3,5,6-tetramethoxy-1,4-benzoquinone with an aniline compound corresponding to the general formula (3) in which Y is the β-sulfatoethyl or β-hydroxyethyl group, the group —SO₂—Y is in the ortho-position relative to the amino group —NR¹R², R¹ is a hydrogen atom and R² has the meaning given for formula (1f) in the particular tabular example, and subsequent oxidative cyclization and sulfation of the β-hydroxyethylsulfonyl group. These triphendioxazine compounds according to the invention likewise have very good fiber-reactive dyestuff properties and, on the materials mentioned in the description, such as, in particular, cellulose fiber materials, give deep, fast dyeings with the color shade on cotton given in the particular tabular example.

| Ex-ample | Compound of the formula (1f) where R² is ... | Color shade |
|---|---|---|
| 117 | 2-Sulfo-ethyl | reddish-tinged blue |
| 118 | 3-Sulfo-propyl | reddish-tinged blue |
| 119 | Carboxy-methyl | reddish-tinged blue |
| 120 | 2-Carboxy-ethyl | reddish-tinged blue |
| 121 | 2-(4-Sulfophenyl)-ethyl | reddish-tinged blue |
| 122 | 2-(2,4-Disulfophenyl)-ethyl | reddish-tinged blue |

EXAMPLES 123 TO 128

Further triphendioxazine compounds, according to the invention, corresponding to a general formula (1g)

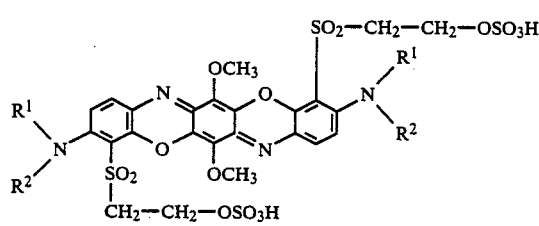

(1g)

(1h)

with the corresponding formula radicals $R^1$ and $R^2$, are described in the following tabular examples. They can be prepared in the manner according to the invention, for example analogously to the above embodiment examples, by reaction of 2,3,5,6-tetramethoxy-1,4-benzoquinone with an aniline compound corresponding to the abovementioned general formula (3b), where $R'_1$ and $R'_2$ have the meaning given in the particular tabular example, and subsequent sulfation and cyclization. These triphendioxazine compounds according to the invention likewise have very good fiber-reactive dyestuff properties and, on the materials mentioned in the description, such as, in particular, cellulose fiber materials, give deep, fast dyeings with the color shade on cotton given in the particular tabular examples.

| Example | Compound of the formula (1g) where $R^1$ is ... | where $R^2$ is ... | Compound of the formula (3b) where $R'_1$ is ... | where $R'_2$ is | Color shade |
|---|---|---|---|---|---|
| 123 | Methyl | 2-Sulfato-ethyl | Methyl | 2-Hydroxy-ethyl | reddish-tinged blue |
| 124 | Ethyl | 2-Sulfato-ethyl | Ethyl | " | reddish-tinged blue |
| 125 | 2-Sulfato-ethyl | 2-Sulfato-ethyl | 2-Hydroxy-ethyl | " | reddish-tinged blue |
| 126 | 2-Sulfo-ethyl | 2-Sulfo-ethyl | 2-Sulfo-ethyl | 2-Sulfo-ethyl | reddish-tinged blue |
| 127 | Methyl | " | Methyl | " | reddish-tinged blue |
| 128 | 3-Sulfato-propyl | 3-Sulfato-propyl | 3-Hydroxy-propyl | 3-Hydroxy-propyl | reddish-tinged blue |

EXAMPLES 129 TO 133

Further triphendioxazine compounds, according to the invention, corresponding to a general formula (1h) and the corresponding formula radical $R^2$ are described in the following tabular examples. They can be prepared in the manner according to the invention, for example analogously to the above embodiment examples, by reaction of 1,4-benzoquinone with an aniline compound corresponding to the general formula (3a) given earlier, where $R'_2$ has the meaning given in the particular tabular example, and subsequent sulfation and cyclization. These triphendioxazine compounds according to the invention likewise have bery good fiber-reactive dyestuff properties and, on the materials mentioned in the description, such as, in particular, cellulose fiber materials, give deep, fast dyeings with the color shade on cotton given in the particular tabular example.

| Example | Compound of the formula (1h) where $R^2$ is | Starting amine (3a) where $R'_2$ is | Color shade |
|---|---|---|---|
| 129 | 3-Sulfato-propyl | 3-Hydroxy-propyl | reddish-tinged blue |
| 130 | 2-Sulfato-propyl | 2-Hydroxy-propyl | reddish-tinged blue |
| 131 | 2-Sulfato-isopropyl | 2-Hydroxy-isopropyl | reddish-tinged blue |
| 132 | 4-Sulfato-butyl | 4-Hydroxy-butyl | reddish-tinged blue |
| 133 | 2-(2'-Sulfo-4'-β-sulfato-ethylsulfonyl-phenyl)-ethyl | 2-(2'-Sulfo-4'-β-hydroxy-ethylsulfonyl-phenyl)-ethyl | reddish-tinged blue |

EXAMPLES 134 TO 139

Further triphendioxazine compounds, according to the invention, corresponding to a general formula (1h) with the corresponding formula radicals $R^2$ are described in the following tabular examples. They can be prepared in the manner according to the invention, for example, analogously to the above embodiment examples, by reaction of 1,4-benzoquinone with an aniline compound corresponding to the general formula (3) in which Y is the β-sulfatoethyl or β-hydroxyethyl group, the group $-SO_2-Y$ is in the ortho-position relative to the amino group $-NR^1R^2$, $R^1$ is a hydrogen atom and $R^2$ has the meaning given for formula (1h) in the particular tabular example, and subsequent oxidative cyclization and sulfation of the β-hydroxyethylsulfonyl group. These triphendioxazine compounds according to the invention likewise have very good fiber-reactive dyestuff properties and, on the materials mentioned in the description, such as, in particular, cellulose fiber materials, give deep, fast dyeings with the color shade on cotton given in the particular tabular example.

| Example | Compound of the formula (1h) where $R^2$ is ... | Color shade |
|---|---|---|
| 134 | 2-Sulfo-ethyl | reddish-tinged blue |

-continued

| Example | Compound of the formula (1h) where $R^2$ is... | Color shade |
|---|---|---|
| 135 | 3-Sulfo-propyl | reddish-tinged blue |
| 136 | Carboxy-methyl | reddish-tinged blue |
| 137 | 2-Carboxy-ethyl | reddish-tinged blue |
| 138 | 2-(4-Sulfophenyl)-ethyl | reddish-tinged blue |
| 139 | 2-(2,4-Disulfophenyl)-ethyl | reddish-tinged blue |

EXAMPLES 140 to 145

Further triphendioxazine compounds, according to the invention, corresponding to a general formula (1j)

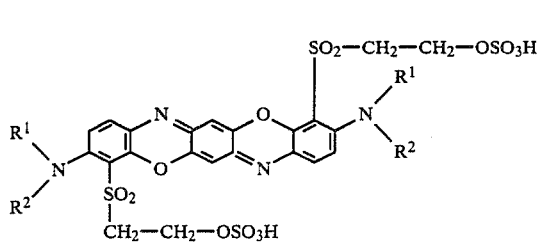
(1j)

with the corresponding formula radicals $R^1$ and $R^2$, are described in the following tabular examples. They can be prepared in the manner according to the invention, for example analogously to the above embodiment examples, by reaction of 1,4-benzoquinone with an aniline compound corresponding to the abovementioned general formula (3b), where $R'_1$ and $R'_2$ have the meaning given in the particular tabular example, and subsequent sulfation and cyclization. These triphendioxazine compounds according to the invention likewise have very good fiber-reactive dyestuff properties and, on the materials mentioned in the description, such as, in particular, cellulose fiber materials, give deep, fast dyeings with the color shade on cotton given in the particular tabular example.

| Example | Compound of the formula (1j) where $R^1$ is... | where $R^2$ is... | Compound of the formula (3b) where $R'_1$ is... | where $R'_2$ is... | Color shade |
|---|---|---|---|---|---|
| 140 | Methyl | 2-Sulfato-ethyl | Methyl | 2-Hydroxy-ethyl | reddish-tinged blue |
| 141 | Ethyl | " | Ethyl | " | reddish-tinged blue |
| 142 | 2-Sulfato-ethyl | " | 2-Hydroxy-ethyl | " | reddish-tinged blue |
| 143 | 2-Sulfo-ethyl | 2-Sulfo-ethyl | 2-Sulfo-ethyl | 2-Sulfo-ethyl | reddish-tinged blue |
| 144 | Methyl | " | Methyl | " | reddish-tinged blue |
| 145 | 3-Sulfato-propyl | 3-Sulfato-propyl | 3-Hydroxy-propyl | 3-Hydroxy-propyl | reddish-tinged blue |

EXAMPLES 146 TO 150

Further triphendioxazine compounds, according to the invention, corresponding to a general formula (1k) and the corresponding formula radical $R^2$ are described in the following tabular examples. They can be prepared in the manner according to the invention, for example analogously to the above embodiment examples, by reaction of 2,5-dimethyl-3,6-dichloro-1,4-benzoquinone with an aniline compound corresponding to the general formula (3a) given earlier, where $R'_2$ has the meaning given in the particular tabular example, and subsequent sulfation and cyclization. These triphendioxazine compounds according to the invention likewise have very good fiber-reactive dyestuff properties and, on the materials mentioned in the description, such as, in particular, cellulose fiber materials, give deep, fast dyeings with the color shade on cotton given in the particular tabular example.

(1k)

| Example | Compound of the formula (1k) where $R^2$ is | Starting amine (3a) where $R'_2$ is | Color shade |
|---|---|---|---|
| 146 | 3-Sulfato-propyl | 3-Hydroxy-propyl | reddish-tinged blue |
| 147 | 2-Sulfato-propyl | 2-Hydroxy-propyl | reddish-tinged blue |
| 148 | 2-Sulfato-isopropyl | 2-Hydroxy-isopropyl | reddish-tinged blue |
| 149 | 4-Sulfato-butyl | 4-Hydroxy-butyl | reddish-tinged blue |
| 150 | 2-(2'-Sulfo-4'-β-sulfato-ethylsulfonyl-phenyl)-ethyl | 2-(2'-Sulfo-4'-β-hydroxy-ethylsulfonyl-phenyl)-ethyl | reddish-tinged blue |

EXAMPLES 151 TO 156

Further triphendioxazine compounds, according to the invention, corresponding to a general formula (1k) with the corresponding formula radicals $R^2$ are described in the following tabular examples. They can be prepared in the manner according to the invention, for example analogously to the above embodiment examples, by reaction of 2,5-dimethyl-3,6-dichloro-1,4-benzoquinone with an aniline compound corresponding to the general formula (3) in which Y is the β-sulfatoethyl or β-hydroxyethyl group, the group —$SO_2$—Y is in the ortho-position relative to the amino group —$NR^1R^2$, $R^1$ is a hydrogen atom and $R^2$ has the meaning given for formula (1k) in the particular tabular example, and subsequent oxidative cyclization and sulfation of the β-hydroxyethylsulfonyl group. These triphendioxazine compounds according to the invention likewise have very good fiber-reactive dyestuff properties and, on the materials mentioned in the description, such as, in particular, cellulose fiber materials, give deep, fast dyeings with the color shade on cotton given in the particular tabular example.

| Example | Compound of the formula (1k) where $R^2$ is... | Color shade |
|---|---|---|
| 151 | 2-Sulfo-ethyl | reddish-tinged blue |
| 152 | 3-Sulfo-propyl | reddish-tinged blue |
| 153 | Carboxy-methyl | reddish-tinged blue |
| 154 | 2-Carboxy-ethyl | reddish-tinged blue |
| 155 | 2-(4-Sulfophenyl)-ethyl | reddish-tinged blue |
| 156 | 2-(2,4-Disulfophenyl)-ethyl | reddish-tinged blue |

EXAMPLES 157 TO 162

Further triphendioxazine compounds, according to the invention, corresponding to a general formula (1m)

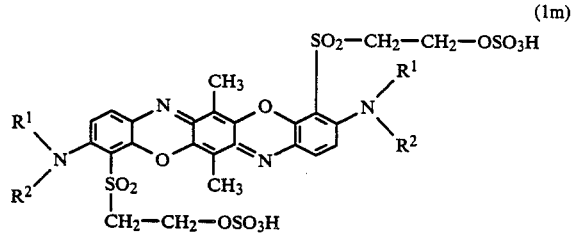

(1m)

with the corresponding formula radicals $R^1$ and $R^2$, are described in the following tabular examples. They can be prepared in the manner according to the invention, for example analogously to the above embodiment examples, by reaction of 2,5-dimethyl-3,6-dichloro-1,4-benzoquinone with an aniline compound corresponding to the abovementioned general formula (3b), where $R'_1$ and $R'_2$ have the meaning given in the particular tabular example, and subsequent sulfation and cyclization. These triphendioxazine compounds according to the invention likewise have very good fiber-reactive dyestuff properties and, on the materials mentioned in the description, such as, in particular, cellulose fiber materials, give deep, fast dyeings with the color shade on cotton given in the particular tabular example.

EXAMPLE 163

(a) 72 parts of 3-($\beta$-hydroxyethylsulfonyl)-4-($\beta$-phenethylamino)-aniline are dissolved in 6000 parts of water at 65° C. to give a clear solution. 25 parts of chloranil are introduced and a pH of 6 to 6.5 is maintained at a reaction temperature of about 65° C. during the reaction using about 23 parts of sodium carbonate. The batch is subsequently stirred for a further five hours and the reaction product is filtered off with suction at about 60° C., washed with 4000 parts of water and dried under reduced pressure at 70° C. b) 80 parts of the anil intermediate obtained under a) are introduced into 5000 parts of 20% strength oleum at a temperature between 20° and 25° C. The reaction batch is then subsequently stirred at this temperature for about a further 10 hours; 481 parts of sodium peroxodisulfate are then introduced, and in particular in a manner such that the reaction temperature can be kept at 20° to 30° C. The batch is subsequently stirred at this temperature for a further 15 hours and then, for quantitative sulfation, at 65° C. for a further 1 hour, and is then cooled, poured onto ice and brought to a pH of between 1 and 1.5 with calcium carbonate and then to a pH of 5.5 with sodium carbonate, the calcium sulfate precipitated is filtered off and washed out with water and the filtrates are combined.

The triphendioxazine compound according to the invention can be obtained in the form of its sodium salt by evaporation or spray-drying of the combined filtrate. It has the probable formula, written in the form of the free acid,

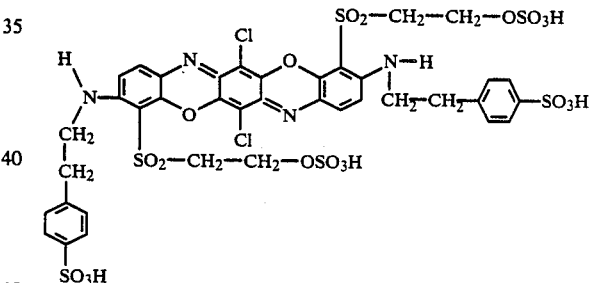

(the particular $\beta$-sulfatoethylsulfonyl group can also be bonded in the other ortho-position relative to the ($\beta$-sulfophenethyl)-amino group, but is more probably in the position shown by the above formula, in each case in the ortho-position relative to the dioxazine oxygen atom and amino nitrogen atom).

This compound according to the invention has very good fiber-reactive dyestuff properties. It dyes the ma-

| Example | Compound of the formula (1m) where $R^1$ is... | where $R^2$ is... | Compound of the formula (3b) where $R'_1$ is... | where $R'_2$ is... | Color shade |
|---|---|---|---|---|---|
| 157 | Methyl | 2-Sulfato-ethyl | Methyl | 2-Hydroxy-ethyl | reddish-tinged blue |
| 158 | Ethyl | 2-Sulfato-ethyl | Ethyl | 2-Hydroxy-ethyl | reddish-tinged blue |
| 159 | 2-Sulfato-ethyl | 2-Sulfato-ethyl | 2-Hydroxy-ethyl | 2-Hydroxy-ethyl | reddish-tinged blue |
| 160 | 2-Sulfo-ethyl | 2-Sulfo-ethyl | 2-Sulfo-ethyl | 2-Sulfo-ethyl | reddish-tinged blue |
| 161 | Methyl | 2-Sulfo-ethyl | Methyl | 2-Sulfo-ethyl | reddish-tinged blue |
| 162 | 3-Sulfato-propyl | 3-Sulfato-propyl | 3-Hydroxy-propyl | 3-Hydroxy-propyl | reddish-tinged blue | terials mentioned in the description, in particular cellulose fiber materials, such as cotton, by the procedures known and customary in the art for application and fixing of fiber-reactive dyestuffs, in deep, clear reddish-tinged blue shades with good fastness properties, such as, in particular, good fastness to light of the dry or moist dyeing, such as the dyeing moistened with drinking water, good fastness to light under the influence of alkaline perspiration, fastness to chlorinated water, fastness to hypochlorite, fastness to alkaline perspiration, fastness to washing, fastness to lying under wet conditions and stability to acid storage.

In aqueous solution, it exhibits an absorption maximum at 618 nm in the visible range.

(c) The aniline compound employed under a) can be prepared, for example, as follows:

132.8 parts of 2-(β-hydroxyethylsulfonyl)-4-nitrochlorobenzene are slowly added to a solution of 151.3 parts of phenethylamine in 500 parts by volume of isopropanol at a temperature of 65° C. and the reaction batch is further stirred at 65° to 80° C. for another 6 hours and then cooled slowly to 5° C., with stirring. On cooling, highly pure 2-(β-hydroxyethylsulfonyl)-4-nitro-1-(β-phenethyl)-aminobenzene crystallizes out of the alcoholic medium. After filtration with suction and extraction by stirring in water, this compound can be employed in the catalytic hydrogenation to convert the nitro group into the amino group. For this, 70 parts of this nitro compound are dissolved in 400 parts by volume of methanol and are hydrogenated in the presence of a nickel catalyst in an autoclave at a temperature of up to 100° C. under a pressure of 50 bar of hydrogen. The catalyst is then filtered off and the filtrate is allowed to crystallize out by acidification of the methanolic solution, for example with hydrochloric acid. 3-(β-hydroxyethylsulfonyl)-4-(β-phenethylamino)-aniline hydrochloride is obtained in a good yield and high purity.

EXAMPLE 164

(a) 608 parts of 3-(β-hydroxyethylsulfonyl)-4-[β-(β'-hydroxyethoxy)-ethylamino-]-aniline are dissolved in 6000 parts of water at 65° C. to give a clear solution. 248 parts of chloranil are introduced and a pH of 6 to 6.5 is maintained at a reaction temperature of about 65° C. during the reaction using about 180 parts of sodium bicarbonate. The batch is subsequently stirred for a further hour and the reaction product is filtered off with suction at about 60° C., washed with 4000 parts of water and dried under reduced pressure at 70° C.

(b) 781 parts of the anil intermediate obtained under (a) are introduced into 5000 parts of 10% strength oleum at a temperature between 20° and 25° C. The reaction batch is then subsequently stirred at this temperature for about a further ten hours; 481 parts of sodium peroxodisulfate are then introduced, in particular in a manner such that the reaction temperature can be kept at 20° to 25° C. The batch is subsequently stirred at this temperature for a further 15 hours and then poured onto ice and brought to a pH of between 1 and 1.5 with calcium carbonate and then to a pH of 5.5 with sodium carbonate, the calcium sulfate precipitated is filtered off and washed out with water and the filtrates are combined.

The triphendioxazine compound according to the invention can be obtained in the form of its sodium salt by salting out by means of electrolyte, such as sodium chloride, or evaporation or spray-drying of the combined filtrate. It has the probable formula, written in the form of the free acid,

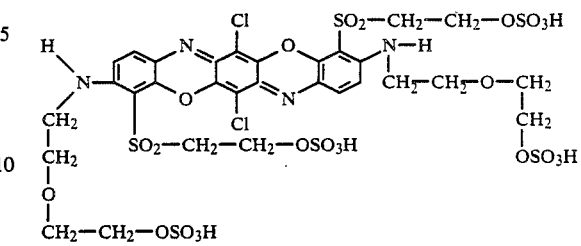

(the particular β-sulfatoethylsulfonyl group can also be bonded in the other ortho-position relative to the (β-sulfatoethoxyethyl)-amino group, but is more probably in the position shown by the above formula, in each case in the ortho-position relative to the dioxazine oxygen atom and amino nitrogen atom).

This compound according to the invention has very good fiber-reactive dyestuff properties. It dyes the materials mentioned in the description, in particular cellulose fiber materials, such as cotton, by the procedures customary and known in the art for application and fixing of fiber-reactive dyestuffs, in deep, clear reddish-tinged blue shades with good fastness properties, such as, in particular, good fastness to light of the dry or moist dyeing, such as the dyeing moistened with drinking water, good fastness to light under the influence of alkaline perspiration, fastness to chlorinated water, fastness to hypochlorite, fastness to alkaline perspiration, fastness to washing, also in the presence of perborates, fastness to lying under wet conditions and stability to acid storage.

In aqueous solution, it exhibits an absorption maximum at 617 nm in the visible range.

(c) The aniline compound employed under a) can be prepared, for example, as follows:

132.8 parts of 2-(β-hydroxyethylsulfonyl)-4-nitrochlorobenzene are slowly added to a solution of 140 parts of 2-(2-aminoethoxy)-ethanol in 500 parts by volume of ethanol at a temperature of 75° C. and the reaction batch is further stirred at this temperature for another 6 hours. 400 parts by volume of methanol are then distilled off from the reaction batch, with simultaneous continuous addition of water. On cooling, highly pure 2-(β-hydroxyethylsulfonyl)-4-nitro-1-(β-hydroxyethoxyethyl)-aminobenzene crystallizes out of the now aqueous medium. This compound can be employed in the catalytic hydrogenation for conversion of the nitro group into the amino group. For this, 68 parts of this nitro compound are dissolved in 400 parts of water and are hydrogenated in the presence of a palladium catalyst in an autoclave at a temperature of up to 100° C. under a pressure of 50 bar of hydrogen. The catalyst is then filtered off and the amine is reacted directly, using the filtrate, according to the instructions in (a). The 3-(β-hydroxyethylsulfonyl)-4-[β-β'-hydroxyethoxy)-ethylamino]-aniline is obtained in a good yield and high purity.

EXAMPLES 165 TO 175

Further triphendioxazine compounds, according to the invention, corresponding to the general formula (1a) and the corresponding formula radical R² are described in the following tabular examples. They can be prepared in the manner according to the invention, for example analogously to embodiment Examples 1 to 4 or 164, by reaction of chloranil with an aniline compound corresponding to the general formula (3a) where $R'_2$ has the meaning given in the particular tabular example and subsequent sulfation and cyclization. These triphendioxazine compounds according to the invention likewise have very good fiber-reactive dyestuff properties and, on the materials mentioned in the description, such as, in particular, cellose fiber materials, give deep, fast dyeings with the color shade on cotton given in the particular tabular example.

| Example | Compound of the formula (1a) where $R^2$ is ... | Starting amine (3a) where $R'_2$ is ... | Color shade ($\lambda_{max}$) |
|---|---|---|---|
| 165 | 2-[Bis-($\beta$-sulfatoethyl)]-amino-ethyl | 2-[Bis-($\beta$-hydroxyethyl)]-amino-ethyl | reddish-tinged blue |
| 166 | 3-[Bis-($\beta$-sulfatoethyl)]-amino-propyl | 3-[Bis-($\beta$-hydroxyethyl)]-amino-propyl | reddish-tinged blue |
| 167 | —$CH_2$—$CH_2$—O—$CH_2$—$CH_2$—$OSO_3H$ | —$CH_2$—O—$CH_2$—$CH_2$—$CH_2$—OH | reddish-tinged blue (617) |
| 168 | —$CH_2$—$CH_2$—(O—$CH_2$—$CH_2$)$_2$—$OSO_3H$ | —$CH_2$—$CH_2$—(O—$CH_2$—$CH_2$)$_2$—OH | reddish-tinged blue (617) |
| 169 | —$CH_2$—$CH_2$—(O—$CH_2$—$CH_2$)$_3$—$OSO_3H$ | —$CH_2$—$CH_2$—(O—$CH_2$—$CH_2$)$_3$—OH | reddish-tinged blue (617) |
| 170 | —$CH_2$—$CH_2$—(O—$CH_2$—$CH_2$)$_4$—$OSO_3H$ | —$CH_2$—$CH_2$—(O—$CH_2$—$CH_2$)$_4$—OH | reddish-tinged blue (617) |
| 171 | 3-[N—Methyl-N—$\beta$-sulfato-ethyl]-amino-propyl | 3-[N—Methyl-N—$\beta$-hydroxy-ethyl]-amino-propyl | reddish-tinged blue |
| 172 | 2-($\beta$-Sulfatoethylamino)-ethyl | 2-($\beta$-Hydroxyethylamino)-ethyl | reddish-tinged blue (600) |
| 173 | 2-($\gamma$-Sulfato-$\beta$-methyl-ethyl)-amino-ethyl | 2-($\gamma$-Hydroxy-$\beta$-methyl-ethyl)-amino-ethyl | reddish-tinged blue (592) |
| 174 | $\beta$-Phosphatoethyl | $\beta$-Hydroxyethyl | reddish-tinged blue |
| 175 | Tri-(sulfatomethyl)-methyl | Tri-(hydroxymethyl)-methyl | reddish-tinged blue |

USE EXAMPLE 1

To dye a cotton fabric, an aqueous dyebath containing, in 2000 parts by volume, 2 parts of the dyestuff from Example 1 or 2, 10 parts of anhydrous sodium sulfate, 10 parts of anhyydrous sodium carbonate and 4 parts by volume of 32.5% strength aqueous sodium hydroxide solution is prepared. 100 parts of a cotton fabric are introduced into this dyebath and dyeing is carried out at a temperature of 40° C. for between 60 and 90 minutes. After soaping and rinsing in the customary manner, a deep, brilliant blue dyeing with the very good fastness properties during use and manufacture mentioned in the description is obtained.

USE EXAMPLE 2

For printing a mercerized cotton fabric, a printing paste containing, per 1000 parts, 15 parts of the dyestuff from Example 1 or 2, 50 parts of urea, 410 parts of water, 500 parts of a neutral 4% strength aqueous alginate thickener, 15 parts of sodium bicarbonate and 10 parts of the sodium salt of m-nitrobenzoic acid is used. The cotton fabric is printed with this printing paste in the customary manner and, after drying, is steamed with steam at 101° to 103° C. for 10 to 15 minutes. After this fixing operation, the fabric is finished in the customary manner by rinsing with cold and warm water and by soaping at the boiling point, renewed rinsing with water and subsequent drying. A deep, brilliant blue print which has very good fastness to light and wet is obtained.

USE EXAMPLE 3

To dye a cotton fabric, an aqueous padding liquor containing, per liter, 20 parts of the dyestuff from Example 1 or 2, 100 parts of urea, 30 parts of anhydrous sodium sulfate and 16 parts by volume of an aqueous 32.5% strength sodium hydroxide solution is prepared. The cotton fabric is padded at room temperature with a liquor pickup of 80% of the weight of the cotton fabric, and is wound up to a skein, enclosed in plastic film and left to lie at room temperature for 24 hours. During this period, the dyestuff is fixed. After soaping and rinsing in the customary manner, a deep brilliant blue dyeing is obtained on the cotton fabric.

USE EXAMPLE 4

15 parts of the dyestuff from Example 1 or 2 are dissolved in 200 parts of water at 70° C.; this solution is stirred into 500 parts of a neutral or weakly acid, 4% strength alginate thickener. This thickened dyestuff solution is made up to 1000 parts with 285 parts of water. Mercerized cotton fabric is printed in the customary manner with the printing paste thus prepared and is then dried and, to fix the dyestuff, is passed through a hot aqueous fixing bath, at 90° to 105° C., containing, in 1000 parts of water, 100 parts of sodium chloride, 150 parts of anhydrous sodium carbonate, 50 parts of anhydrous potassium carbonate and 70 parts by volume of a 33% strength aqueous sodium hydroxide solution. In this case, fixing already takes place in a few seconds, so that the printed fabric can be passed through very rapidly. After this fixing treatment, the fabric is finished in the customary manner by rinsing with cold water and by hot washing, renewed rinsing with water and drying. A level, blue print pattern with the very good fastnesses to light and wet mentioned in Example 1 is obtained.

USE EXAMPLE 5

For the purpose of dyeing 10 parts of a woollen yarn, an aqueous bath consisting of 0.25 parts by volume of 60% strength aqueous acetic acid, 0.15 parts of a commercially available leveling auxiliary for wool and 0.3 parts of ammonium sulfate in 400 parts of water is prepared. The wool is thoroughly wetted in the bath at a temperature of 30°–40° C. and a pH of the bath of 5–5.2. A solution of 0.1 part of the dioxazine dyestuff from Example 1 or 2 in 20 parts of water is then added to the bath, with stirring. The wool is further agitated therein, the temperature is left at 30° to 40° C. for 5 minutes, the dyebath is then heated to 85° C. in the course of 40 minutes, dyeing is continued at this temperature for 10 minutes and the dyebath is then heated to the boiling point in the course of 10 minutes. Dyeing is continued at the boil for 1 hour. The bath is then cooled to 80° C. The dyestuff used has been absorbed very well onto the wool. After-treatment of the dyed woollen yarn can therefore take place in the same bath. Ammonia is added up to a pH of 8–8.5 and the material is treated at this pH and at a temperature of 80° C. for 15 minutes. It is taken out of the bath, rinsed with warm and cold water and dried. A deep, blue dyeing with very good fastnesses to light and wet is obtained.

USE EXAMPLE 6

If one of the procedures described above is followed according to the present invention for dyeing and printing wool or synthetic polyamide materials or cellulose fiber materials, for example analogously to the above use Examples 1 to 5, and, according to the invention, one of the dioxazine dyestuffs according to the invention described in the other previous embodiment examples or tabular examples is employed for this as the dyestuff, strong blue dyeings and prints with good fastness properties are likewise obtained.

What is claimed is:
1. A triphendioxazine compound corresponding to the formula

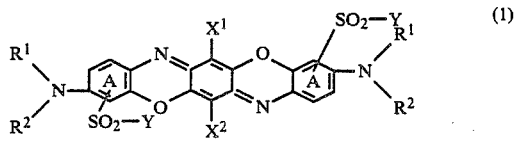

in which

R$^1$ is hydrogen; the R$^2$ terms may have an identical or a different meaning from one another and
each R$^2$ is alkyl of 1 to 6 C-atoms substituted by halogen, carbalkoxy of 2 to 5 C-atoms or alkanoylamino of 2 to 5 C-atoms;
the two benzne nuclei A have no additional substituents or are additionally substituted by 1 or 2 substituents selected from the group consisting of alkyl of 1 to 6 C-atoms, alkoxy of 1 to 5 C-atoms, halogen, carboxy and sulfo,
it being possible for the substituents in the two benzene nuclei A to be identical to one another or different from one another;
X$^1$ is hydrogen, halogen, cycloalkyl, aralkyloxy, alkoxy of 1 to 4 C-atoms, aryloxy, alkyl alkyl of 1 to 4 C-atoms, aryl, araylkyl, cyano, carboxy, carbalkoxy of 2 to 5 C-atoms, N-alkylcarbamoyl, N,N-dialkylcarbamoyl with alkyls of 1 to 4 C-atoms, N-arylcarbamoyl, alkanoylamino of 2 to 5 C-atoms or aroylamino, the aryl radicals in these substituents being phenyl unsubstituted or substituted by 1 or 2 substituents selected from the group consisting of halogen, nitro, alkyl of 1 to 4 C-atoms, alkoxy of 1 to 4 C-atoms, carboxy and sulfo;
X$^2$ is identical to X$^1$ or different from X$^1$ and has one of the meanings given for X$^1$;
the groups —SO$_2$—Y can have different meanings to one another or the same meaning;
Y is vinyl, or is ethyl substituted in the $\beta$-position by a substituent which can be eliminated by an alkali;
the molecule (1) necessarily contains at least one sulfo or sulfato of the sulfo and sulfato groups which the molecule (1) may contain.

2. A triphendioxanzine compound corresponding to the formula

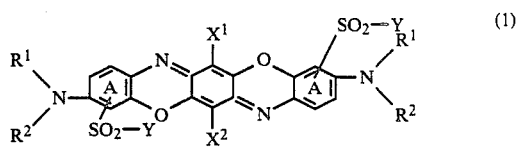

in which

R$^1$ is hydrogen; the R$^2$ terms have an identical or different meaning from one another
and each R$^2$ is alkyl of 1 to 6 C-atoms substituted by phenyl which is unsubstituted or substituted by 1, 2 or 3 substituents selected from the group consisting of alkyl of 1 to 4 C-atoms, alkoxy of 1 to 4 C-atoms, halogen, nitro, sulfo, carboxy, alkanoylamino of 2 to 5 C-atoms, benzoylamino, sulfobenzoylamino and carbalkoxy of 2 to 5 C-atoms, and mandatorily by a group of the formula —SO$_2$—Y' in which Y' is vinyl or is ethyl subbstituted in the $\beta$-position by a substituent which can be eliminated by an alkali, or
R$^2$ is phenyl unsubstituted or substituted by 1, 2 or 3 substituents selected from the group consisting of sulfo, carboxy, halogen, alkyl of 1 to 4 C-atoms, alkoxy of 1 to 4 C-atoms, nitro, alkylamino of 1 to 4 C-atoms; dialkylamino with each alkyl of 1 to 4 C-atoms, alkanoylamino of 2 to 5 C-atoms and benzoylamino, and substituted mandatorily by a group of the formula —SO$_2$—Y' in which Y, is defined as above, or is naphthyl unsubstituted or substituted by 1, 2 or 3 sulfo and substituted by a group of the formula —SO$_2$—Y,;
the two benzene nuclei A have no additional substituents or are additionally substituted by 1 or 2 substituents selected from the group consisting of alkyl of 1 to 6 C-atoms, alkoxy of 1 to 5 C-atoms, halogen, carboxy and sulfo,
it being possible for the substituents in the two benzene nuclei A to be identical to one another or different from one another;
X$^1$ is hydrogen, halogen, cycloalkyl, aralkyloxy, alkoxy of 1 to 4 C-atoms, aryloxy, alkyl of 1 to 4

C-atoms, aryl, aralkyl, cyano, carboxy, carbalkoxy of 2 to 5 C-atoms, N-alkylcarbamoyl, N,N-dialkylcarbamoyl with alkyls of 1 to 4 C-atoms, N-arylcarbamoyl, alkanoylamino of 2 to 5 C-atoms or aroylamino, the aryl radicals in these substituents being phenyl unsubstituted or substituted by 1 or 2 substituents selected from the group consisting of halogen, nitro, alkyl of 1 to 4 C-atoms, alkoxy of 1 to 4 C-atoms, carboxy and sulfo;

$X^2$ is identical to $X^1$ or different from $X^1$ and has one of the meanings given for $X^1$;

the groups —$SO_2$—Y can have different meanings to one another or the same meaning;

Y is vinyl, or is ethyl substituted in the $\beta$-position by a substituent which can be eliminated by an alkali;

the molecule (1) necessarily contains at least one sulfo or sulfato of the sulfo and sulfato groups which the molecule (1) may contain.

3. A compound according to claim 1, in which both groups —$SO_2$—Y have the same meaning.

4. A compound according to claim 1, which contains at least two groups selected from the sulfo and sulfato groups which the compound of claims 1 may contain.

5. A compound according to claim 1, in which $X^1$ and $X^2$ are identical or different and represent a hydrogen, an alkanoylamino of 2 to 5 C-atoms, phenoxy unsubstituted or substituted by chlorine, or are alkoxy of 1 to 4 C-atoms, alkyl of 1 to 4 C-atoms, chlorine and bromine.

6. A compound according to claim 1, in which $X^1$ and $X^2$ are both chlorine.

7. A compound according to claim 1, in which $X^1$ and $X^2$ are both bromine.

8. A compound according to claim 1, in which each —$SO_2$—Y is bonded in the ortho-position relative to the group —$NR^1R^2$.

9. A compound according to claim 1, in which the benzene rings A are substituted in the meta- or para-position relative to the group —$SO_2$—Y by a substituent selected from the group consisting of 1 to 6 C-atoms, alkoxy of 1 to 5 C-atoms, halogen, carboxy and sulfo.

10. A compound according to claim 1, in which the y terms of formula (1) are identical to one another or different from one another and each is vinyl, $\beta$-sulfatoethyl, $\beta$-thiosulfatoetyhyl, $\beta$-chloroethyl or $\beta$-phosphatoethyl.

11. A compound according to claim 1, in which each Y is vinyl or $\beta$-sulfatoethyl.

12. A compound according to claim 2, in which both groups —$SO_2Y$ have the same meaning.

13. A compound according to claim 2, which contains at least two groups selected from the sulfo and sulfato groups which the compound of claim 2 may contain.

14. A compound according to claim 2, in which $X^1$ and $X^2$ are identical or different and represent a hydrogen, an alkanoylamino of 2 to 5 C-atoms, phenoxy unsubstittued or substituted by chlorine, or are alkoxy of 1 to 4 C-atoms, alkyl of 1 to 4 C-atoms, chlorine and bromine.

15. A compound according to claim 2, in which $X^1$ and $X^2$ are both chlorine.

16. A compound according to claim 2, in which $X^1$ and $X^2$ are both bromine.

17. A compound according to claim 2, in which each —$SO_2Y$ is bonded in the ortho position relative to the group —$NR^1R^2$.

18. A compound according to claim 2, in which the benzene rings A are substituted in the meta- or para-position relative to the group —$SO_2Y$ by a substituent selected from the group consisting of alkyl of 1 to 6 C-atoms, alkoxy of 1 to 5 C-atoms, halogen, carboxy and sulfo.

19. A compound according to claim 2, in which Y terms of formula (1) identical to one another or different from one another and each is vinyl, $\beta$-sulfatoethyl, $\beta$-thiosulfatoethyl, $\beta$-chloroethyl or $\beta$-phosphatoethyl.

20. A compound according to claim 2, in which each is vinyl or $\beta$-sulfatoethyl.

* * * * *

UNITED STATES PATENT AND TRADEMARK OFFICE
CERTIFICATE OF CORRECTION

PATENT NO. : 4,785,098
DATED : November 15, 1988
INVENTOR(S) : Hermann Fuchs, Hartmut Springer, Gunther Schwaiger It is certified that error appears in the above-identified patent and that said Letters Patent is hereby corrected as shown below:

In column 39, line 64, the spelling of "benzene" should be amended;

column 40, line 5, one of both --alkyl-- is redundant and must be deleted;

column 40, line 55, the letter "Y;" must be replaced with --Y'--;

column 40, line 58, the formula should read -- $-SO_2-Y'$ --;

column 42, line 3 (claim 10), the letter "y" should read as --Y--.

Signed and Sealed this

Fourth Day of July, 1989

Attest:

DONALD J. QUIGG

Attesting Officer      Commissioner of Patents and Trademarks